(12) United States Patent
Smith

(10) Patent No.: US 10,697,763 B2
(45) Date of Patent: Jun. 30, 2020

(54) OPTICAL ASSEMBLY, METHOD FOR PRODUCING DATA IN SAME, AND METHOD FOR MANUFACTURING STRUCTURE

(71) Applicant: Nikon Corporation, Minato-ku, Tokyo (JP)

(72) Inventor: Daniel Gene Smith, Tucson, AZ (US)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 15/728,272

(22) Filed: Oct. 9, 2017

(65) Prior Publication Data
US 2018/0031367 A1 Feb. 1, 2018

Related U.S. Application Data

(62) Division of application No. 14/365,079, filed as application No. PCT/IB2012/003023 on Dec. 23, 2012, now abandoned.

(Continued)

(51) Int. Cl.
*G01B 11/24* (2006.01)
*G02B 5/122* (2006.01)
(Continued)

(52) U.S. Cl.
CPC .............. *G01B 11/24* (2013.01); *G01S 7/481* (2013.01); *G01S 7/4972* (2013.01); *G02B 5/122* (2013.01); *G02B 26/10* (2013.01)

(58) Field of Classification Search
CPC ....... G01B 11/24; G01S 7/481; G01S 7/4972; G02B 26/10; G02B 5/122
(Continued)

(56) References Cited

U.S. PATENT DOCUMENTS 3,837,726 A * 9/1974 Suzuki ............... G03H 1/00
359/1
4,135,812 A 1/1979 Kingsland
(Continued)

FOREIGN PATENT DOCUMENTS

JP 2011-226785 11/2011
WO WO 2013/093633 6/2013

OTHER PUBLICATIONS

International Preliminary Report on Patentability (with Written Opinion) from International Application No. PCT/IB2012/003023, dated Jun. 24, 2014, 8 pages.
(Continued)

*Primary Examiner* — Tri T Ton
(74) *Attorney, Agent, or Firm* — Klarquist Sparkman, LLP

(57) ABSTRACT

An integrated optical assembly is provided, with enhancements that are particularly useful when the integrated optical assembly forms part of a laser radar system. The integrated optical assembly produces a reference beam that is related to the optical characteristics of a scanning reflector, or to changes in position or orientation of the scanning reflector relative to a source. Thus, if the scanning reflector orientation were to shift from its intended orientation (due e.g. to thermal expansion) or if characteristics of the scanning reflector (e.g. the index of refraction of the scanning reflector) were to change on account of temperature changes, the reference beam can be used to provide data that can be used to account for such changes. In addition, if the scanning reflector were to be positioned in an orientation other than the orientation desired, the reference beam can be used in identifying and correcting that positioning.

23 Claims, 30 Drawing Sheets

Related U.S. Application Data

(60) Provisional application No. 61/580,118, filed on Dec. 23, 2011.

(51) Int. Cl.
    *G01S 7/481*     (2006.01)
    *G01S 7/497*     (2006.01)
    *G02B 26/10*     (2006.01)

(58) Field of Classification Search
    USPC .................................................. 356/600–640
    See application file for complete search history.

(56) References Cited

U.S. PATENT DOCUMENTS

| | | | |
|---|---|---|---|
| 4,537,465 A | | 8/1985 | Sherman et al. |
| 5,576,834 A | * | 11/1996 | Hamada ................ G01J 9/0246 356/452 |
| 6,816,265 B1 | * | 11/2004 | IaGrone ............. G01B 9/02061 356/451 |
| 2012/0188557 A1 | | 7/2012 | Goodwin et al. |
| 2013/0155418 A1 | | 6/2013 | Shaw et al. |
| 2014/0340691 A1 | | 11/2014 | Smith |

OTHER PUBLICATIONS

Notification of Reasons for Rejection, dated Aug. 18, 2015, by the Japanese Patent Office for corresponding Japanese Patent Application No. 2014-548245, in Japanese language with English-language machine translation.

\* cited by examiner

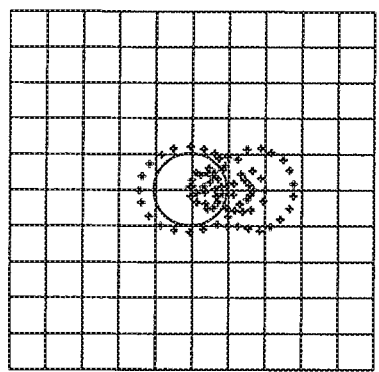
FIG. 17A
FIG. 17B
FIG. 17C

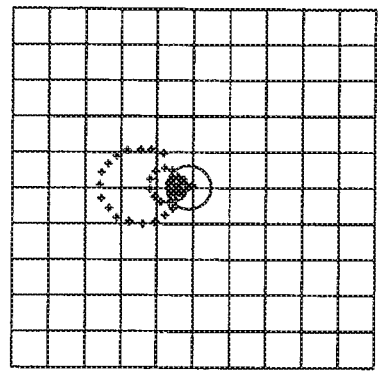
FIG. 20A
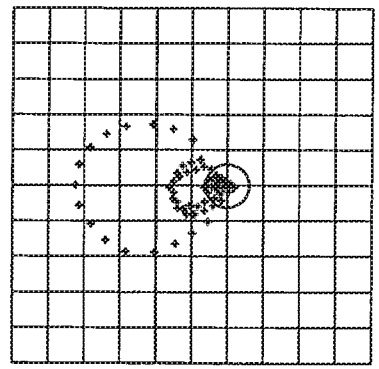
FIG. 20B
FIG. 20C

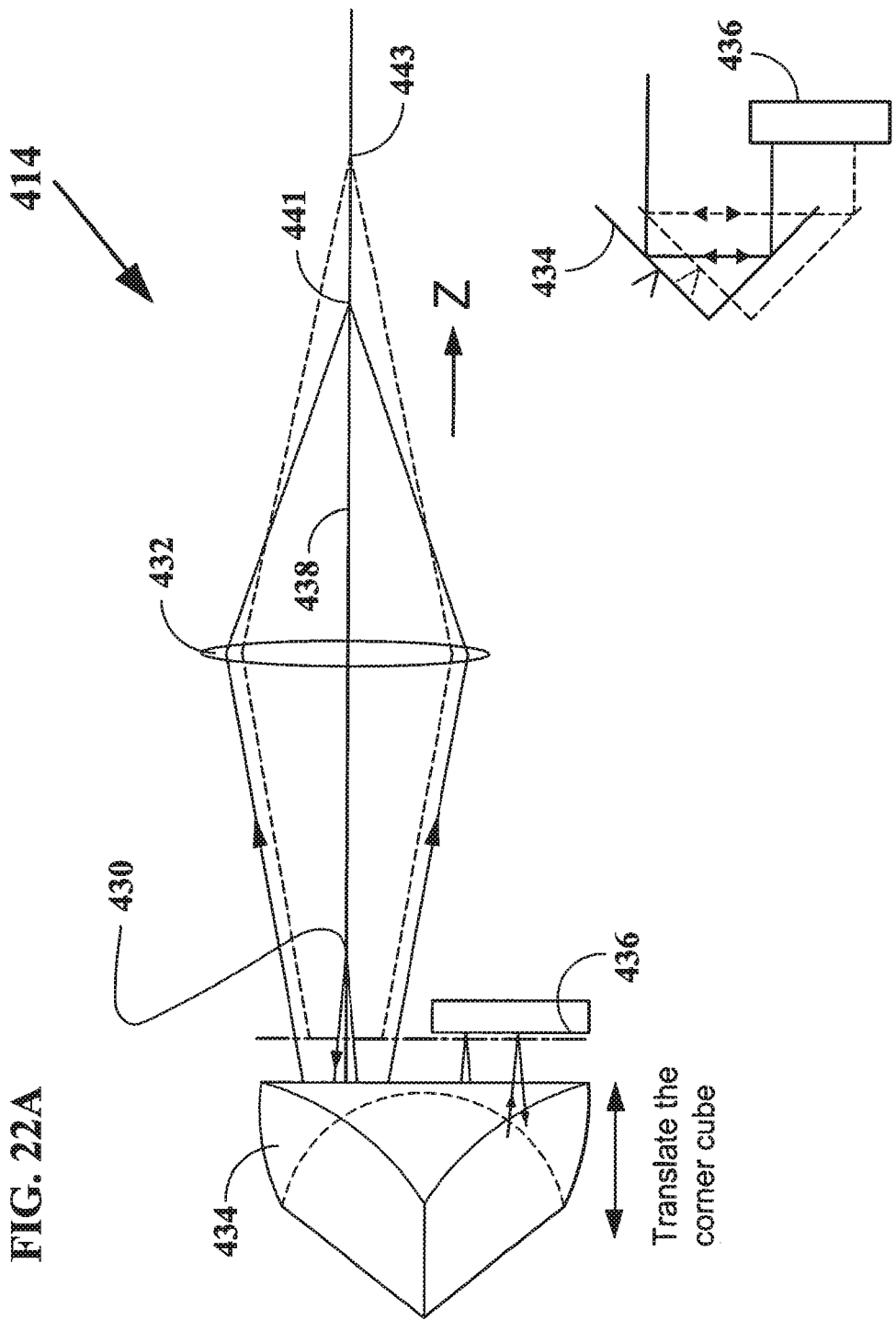

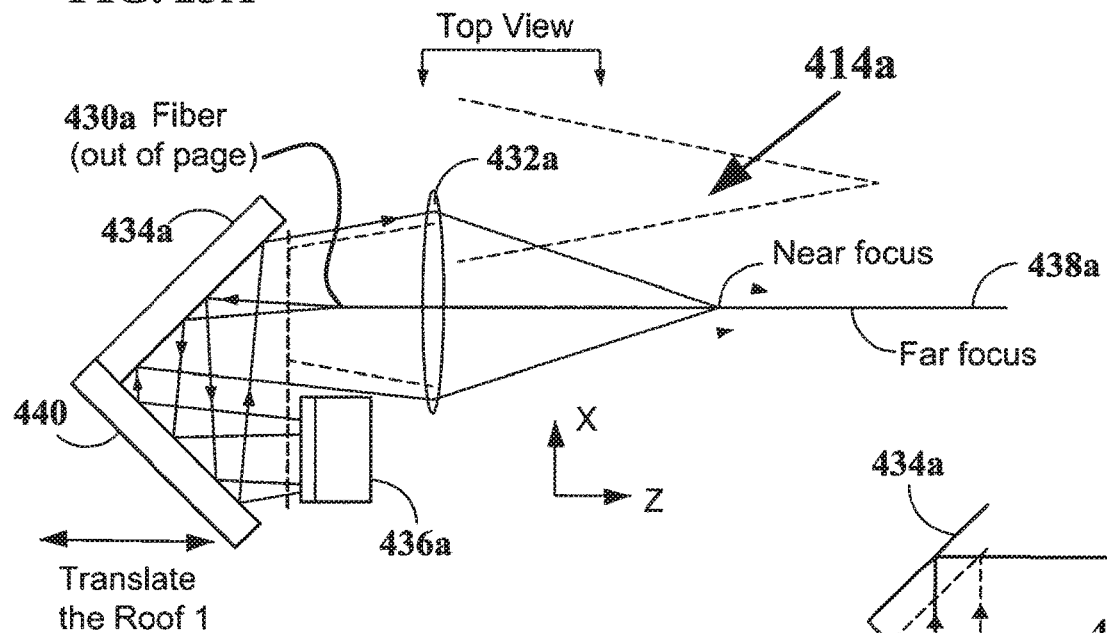
FIG. 23A
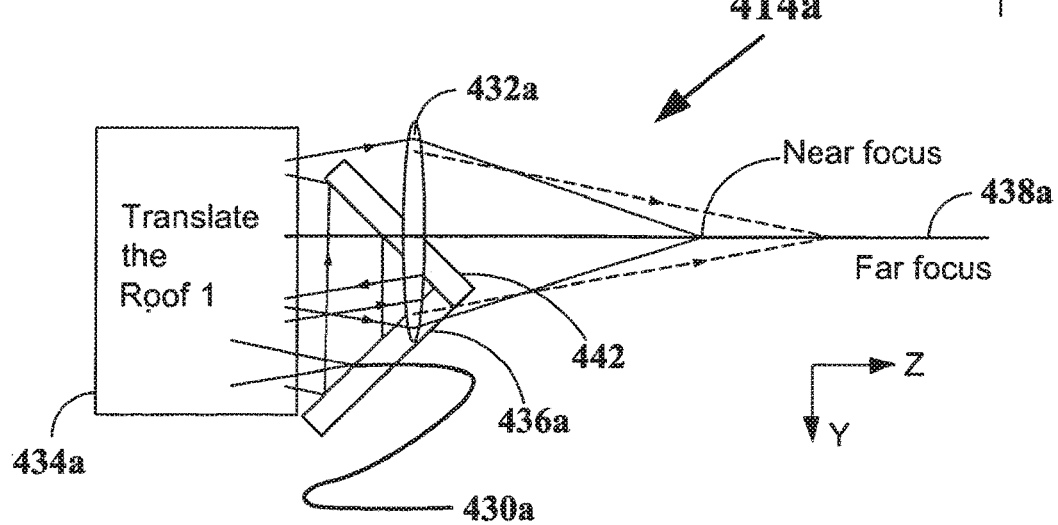
FIG. 23B
FIG. 23C

OPTICAL ASSEMBLY, METHOD FOR PRODUCING DATA IN SAME, AND METHOD FOR MANUFACTURING STRUCTURE

CROSS-REFERENCE TO RELATED APPLICATIONS

This application is a divisional of U.S. application Ser. No. 14/365,079, which is the U.S. National Stage of International Application No. PCT/IB2012/003023, filed Dec. 23, 2012, which was published in English under PCT Article 21(2), which in turn claims the benefit of U.S. Provisional Application No. 61/580,118, filed Dec. 23, 2011, all of which are incorporated herein by reference.

INTRODUCTION AND SUMMARY OF THE PRESENT INVENTION

The present invention provides an optical assembly for focusing a beam from a light source along a line of sight, and to a method of producing useful data in such an optical assembly. The optical assembly and method of the present invention is particularly useful in an integrated optical assembly (IOA) of the type described in a laser radar system of the type shown in Goodwin et al., U.S. Patent Application Publication 2012/0188557, which is incorporated herein by reference. The disclosure of U.S. Patent Application Publication 2012/0188557 is also reproduced herein, and is referred to herein as "Goodwin."

In an IOA of the type shown in Goodwin, a measurement beam from a light source (e.g. that is produced through an optical fiber tip, such that the optical fiber tip can be considered the light source) is directed along a line of sight, by a lens, a scanning reflector (e.g. an adjustable corner cube) and a fixed reflector that are oriented relative to each other such that a beam from the light source is reflected by the scanning reflector to the fixed reflector, and reflected light from the fixed reflector is reflected again by the scanning reflector and directed along the line of sight through the lens. The measurement beam is directed at a target, and light returned from the target (e.g. measurement beam light that is reflected or scattered from the target) is directed to the optical fiber tip that functions as the light source, and is detected and processed to produce data about the target. The scanning reflector is moveable relative to the source, the lens and the fixed reflector, to adjust the focus of the beam along the line of sight. Thus, the scanning reflector may also be referred to as an "adjustable reflector", and since the scanning reflector that is preferred in the present invention is a corner cube that also functions as a retroreflector (because of the manner in which it reflects and transmits light, as it redirects the light), the scanning reflector may also be referred to as a "scanning retroreflector"

According to the present invention, the integrated optical assembly produces a reference beam that is related to the optical characteristics of the scanning reflector, or to changes in position or orientation of the scanning reflector relative to the source. That reference beam is useful in several ways in an IOA of the type shown in Goodwin. For example, if the scanning reflector orientation were to shift from its intended orientation (due e.g. to thermal expansion) or if characteristics of the scanning reflector (e.g. the index of refraction of the scanning reflector) were to change on account of temperature changes, the reference beam can be used to provide data that can be used to account for such changes. In addition, if the scanning reflector were to be positioned in an orientation other than the orientation desired, the reference beam can be used in identifying and correcting that positioning. Essentially, the reference beam can be used to subtract out errors that could be caused by such factors.

The present invention provides several implementations by which an IOA can produce the reference beam. For example, the optical assembly can include a lens between the source and the scanning reflector that is configured to produce a continuous collimated reference beam that traverses the scanning reflector at least twice and is then refocused on the source. The lens is oriented off center, in relation to the source, to collimate the beam at a slight angle to the source, and the optical assembly is further configured so that after two passes through the scanning reflector, the reference signal is refocused on a reflector next to the source, traverses the scanning reflector twice more and is then refocused on the source.

According to another implementation of the present invention, the measurement and reference beams are directed through a pair of fibers, so that the measurement and reference beams that are produced through the pair of fibers effectively comprise the "source" (and both those measurement and reference beams can originate from the same light source that is split into the measurement and reference beams). The measurement beam produced through one fiber is reflected by a fold mirror, traverses the scanning retroreflector (corner cube), is reflected by the fixed reflector, traverses the scanning retroreflector again, and is directed along the line of sight through the lens. The reference beam produced through the other fiber is reflected by a fold mirror, traverses the scanning retroreflector, is reflected by a prism or some other suitable optical element that shifts the reference beam, traverses the scanning retroreflector again, is reflected by a small fixed retroreflector that reflects that reference beam on axis back to the scanning retroreflector which it traverses again and is then reflected by the prism or other suitable optical element that was used in a previous step to shift the beam so that the beam traverses the scanning retroreflector once more before arriving back at the reference beam fiber. Thus, the reference beam is a collimated reference signal that traverses the scanning retroreflector at least twice (four times in this case) and is then refocused on the source (in the i.e. the reference beam fiber).

Further features of the present invention will be further apparent from the following detailed description and the accompanying drawings

BRIEF DESCRIPTION OF THE DRAWINGS

FIGS. 16A-16C, 17A-17C, 18A-18C, 19A-19C, and 20A-20C illustrate certain performance capabilities of an optical assembly according to the embodiment of FIGS. 14A, 14B, and 14C.

FIG. 22A is a schematic illustration of one version of an optical assembly according to another embodiment.

FIG. 22B is a fragmentary, schematic illustration of the optical assembly of FIG. 22A, showing the reflection schema provided by the corner cube and the plane mirror.

FIGS. 23A and 23B are schematic side and top illustrations of a second version of an optical assembly according to the embodiment of FIG. 22A.

FIG. 23C is a fragmentary, schematic illustration of the optical assembly of FIGS. 23A and 23B, showing the reflection schema provided by the reflective roofs of those elements.

DETAILED DESCRIPTION

As described above, the present invention provides enhancements to an integrated optical assembly (IOA) and method that are particularly useful with an IOA for a laser radar system of the type described in Goodwin. The present invention is described herein in connection with an IOA of the type shown in Goodwin, and from that description the manner in which the present invention can be employed in connection with various devices comparable to the IOA of Goodwin will be apparent to those in the art.

The enhancements to the IOA, according to the present invention, are particularly useful in a laser radar system and method as described in Goodwin. As explained in Goodwin, laser radar is a versatile metrology system that offers non-contact and true single-operator inspection of an object (often referred to as a target). Laser radar metrology provides object inspection that is particularly useful in acquiring high quality object inspection data in numerous industries, such as aerospace, alternative energy, antennae, satellites, oversized castings and other large-scale applications. The laser radar can be used, e.g. for manufacturing a structure, comprising: producing a structure based on design information; obtaining shape information of structure by using of the apparatus; obtaining shape information of a structure by arranging a produced structure; comparing a obtained shape information with a design information.

Figure 5:
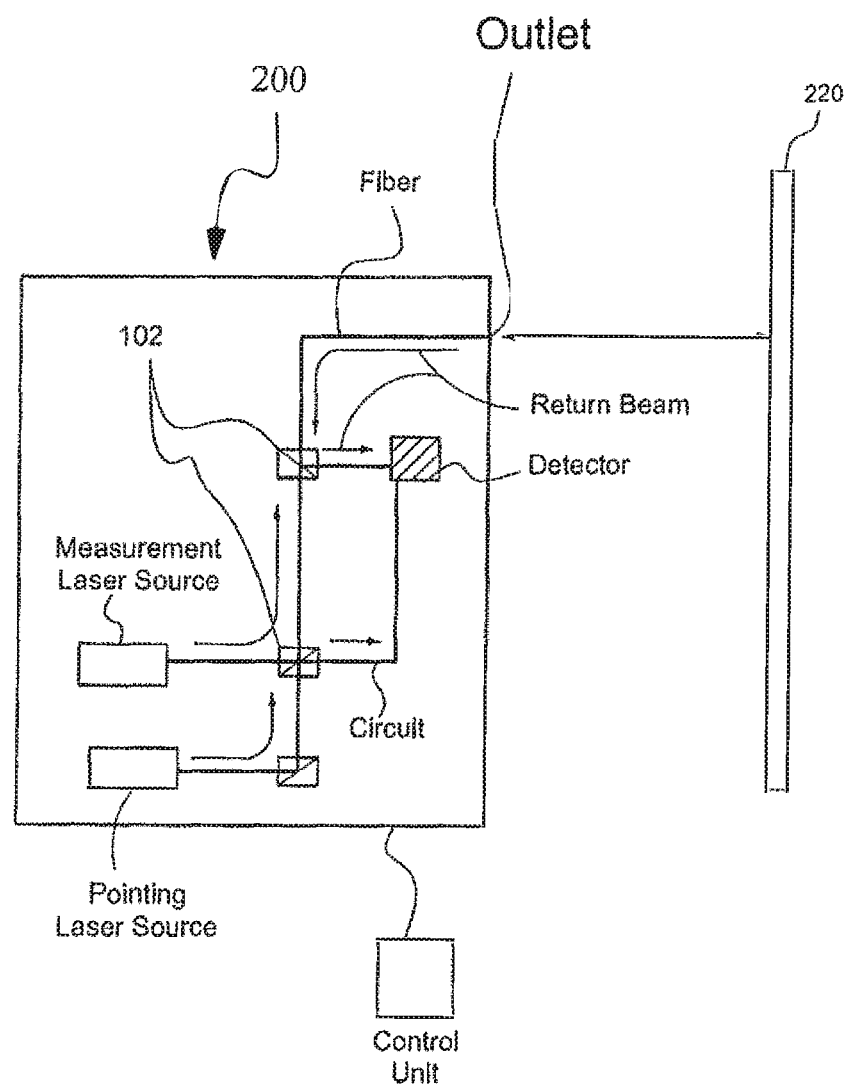
FIG. 5 is a schematic illustration of a laser radar system, in which an IOA with an optical assembly according to the present invention, is provided.
Figure 6:
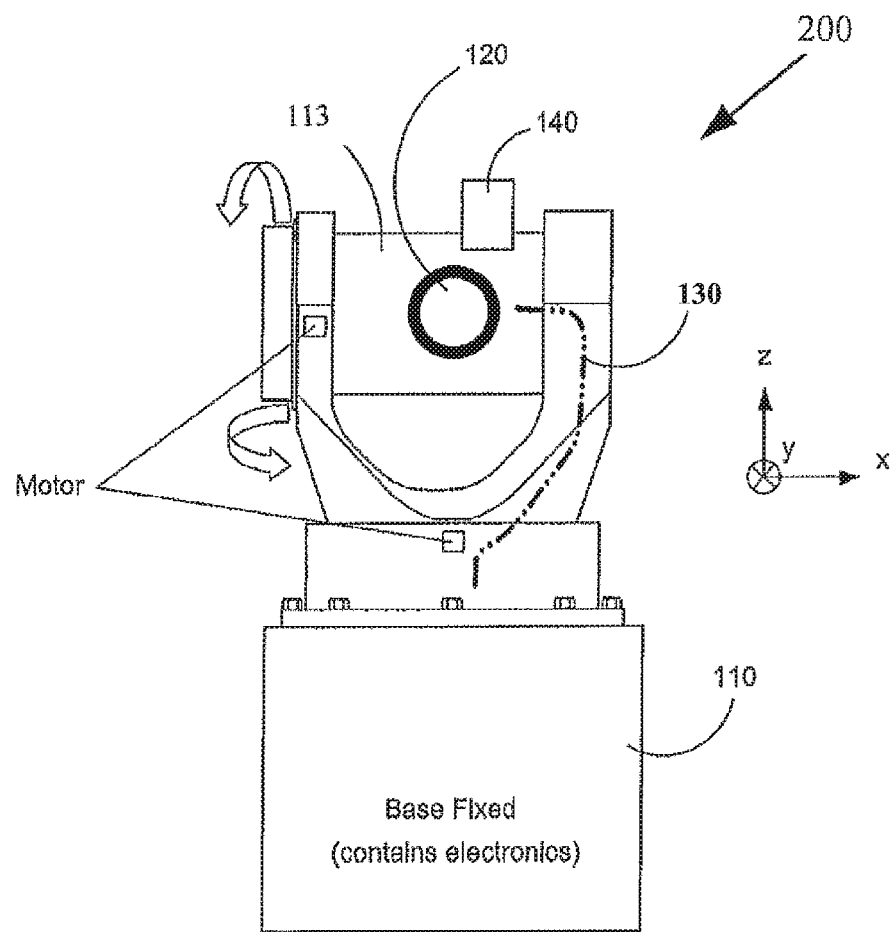
FIG. 6 is a front view of a preferred type of laser radar system.

In the laser radar system and method of Goodwin and FIGS. 5 and 6, the integrated optical assembly (IOA) is provided as part of a laser radar system 200. The IOA is designed to be compact, and to utilize a relatively simple assembly of elements for directing and focusing a pointing beam and a measurement beam at an outlet of the optical radar system. The "source" of the pointing and measurement beams comprises an optical fiber, in the sense that light produced by a light source is directed through the optical fiber. The pointing beam is produced in a visible (e.g. red such as around 610 nm to 750 nm) wavelength range, and the measurement beam is produced in a different, predetermined wavelength range (e.g. infra red such as around 0.7 µm to 10 µm or IR).

In the laser radar system of FIG. 5, the pointing beam is used to identify a point on a target 220 at which the measurement beam is directed. The measurement beam is reflected from the target and a portion of that reflected or scattered measurement beam is received back at the laser radar system, where it is directed back through the fiber, transmitted to a detector, and processed by a control unit to provide the type of useful information that is characteristic of a laser radar system.

As shown in FIG. 6, the laser radar system 200 includes a housing (e.g. a rotatable cylinder 113) in which the optical assembly is located and secured, so that the optical assembly moves as a unit with the cylinder 113 relative to the base 110 of the laser radar system. The laser radar system includes an outlet 120 in the housing 113, and through which radiation (e.g. in the two wavelengths of the pointing and measurement beams) is directed from the laser radar system. The base 110 contains the processing features of the laser radar system, that are disclosed in U.S. Pat. Nos. 4,733,609, 4,824,251, 4,830,486, 4,969,736, 5,114,226, 7,139,446, 7,925,134, and Japanese Patent #2,664,399. The size of the system should be small enough to allow camera 140 to be located on the moving part of the laser radar system.

Yet another concept laser radar system has a rotating scanning (pointing) mirror, that rotates relative to other parts of the laser radar system, and is used to achieve a desired beam direction. Other concepts for Laser radar systems are disclosed in U.S. Pat. Nos. 4,733,609, 4,824,251, 4,830,486, 4,969,736, 5,114,226, 7,139,446, 7,925,134, and Japanese Patent #2,664,399 which are incorporated by reference herein. The laser beam from the laser radar system (referred to herein as the "measurement beam") is controlled by the laser radar system optics, and is directed from the laser radar system and at the target.

Figure 1:
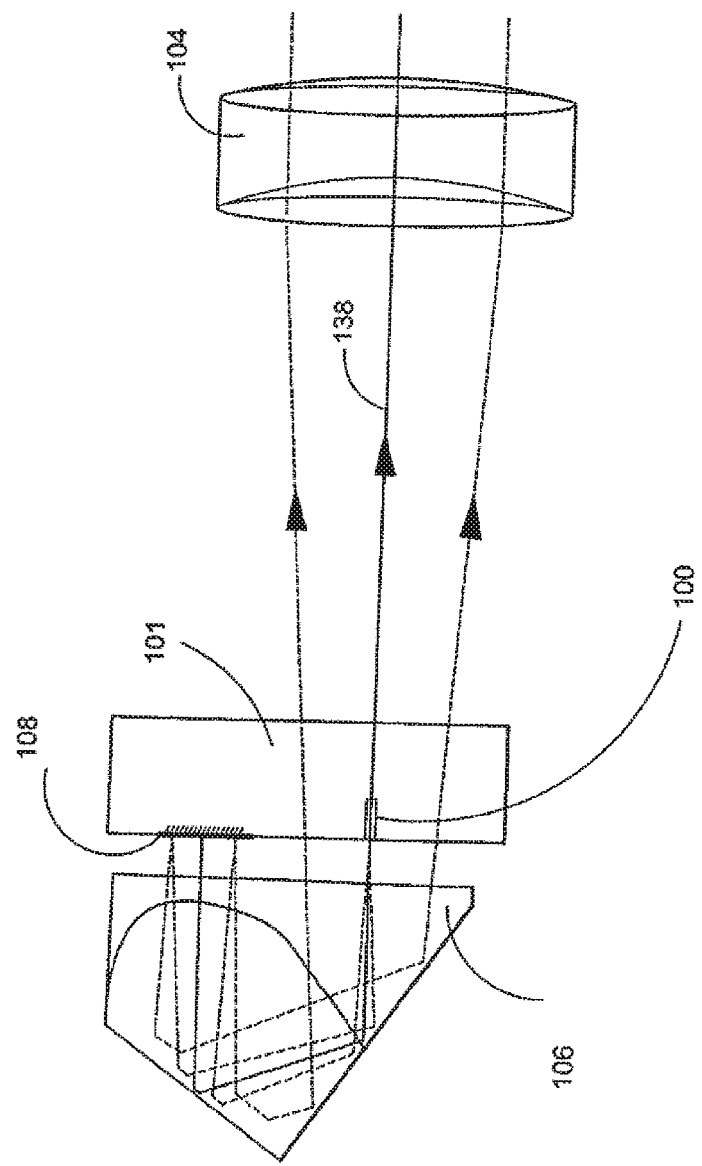
FIG. 1 is a schematic illustration of an IOA of the type shown in Goodwin.
Figure 12:
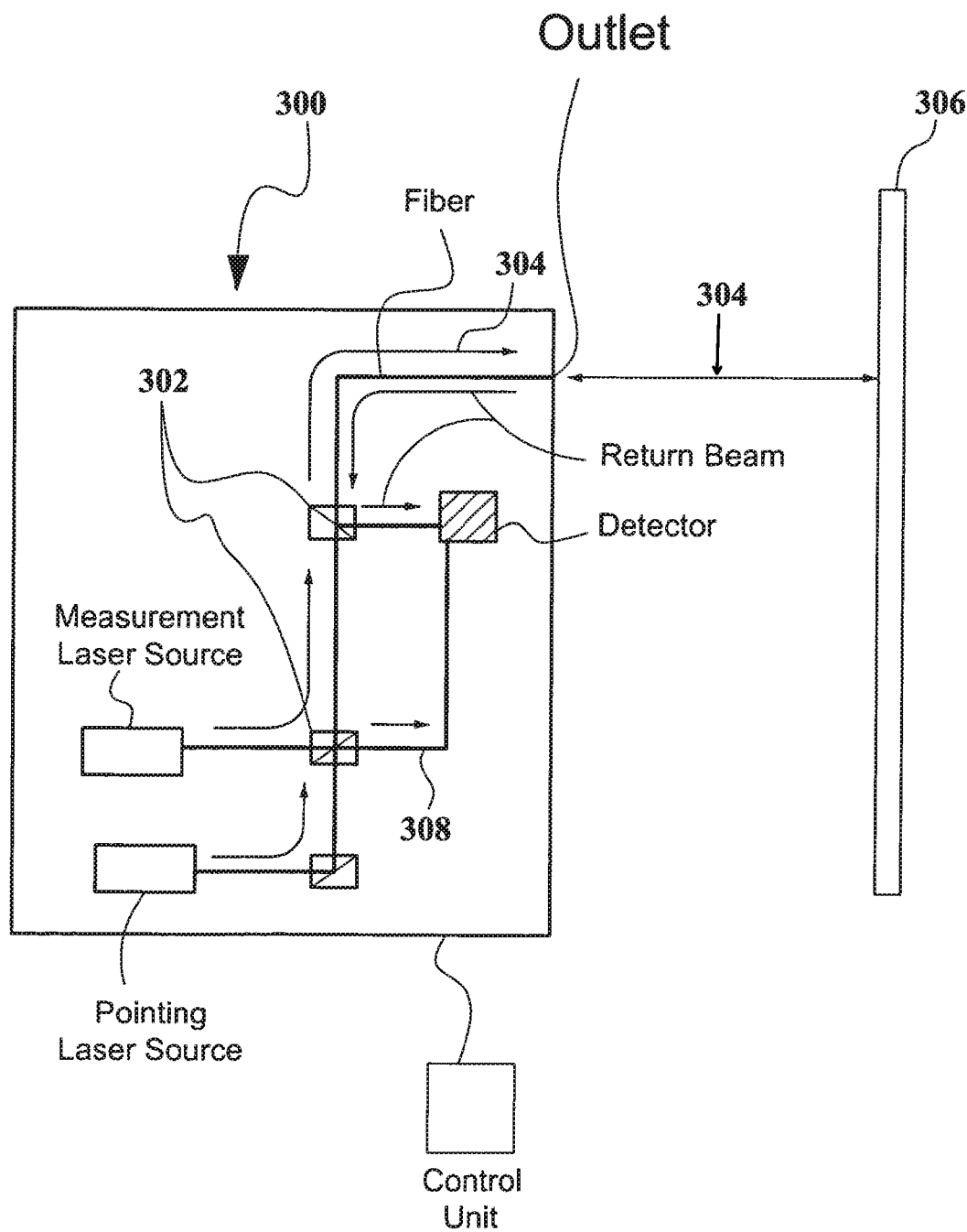
FIG. 12 is a schematic illustration of a laser radar system, of a type that can employ an optical assembly according to another embodiment.

FIG. 1 is a schematic illustration of the IOA of FIG. 12 of Goodwin. In that IOA, a beam from a light source (i.e. a fiber tip 100 supported by a ferule 102 in a glass window 101) is directed along a line of sight, by a lens 104, a scanning reflector 106 (e.g. a corner cube) and a fixed reflector (a mirror 108 supported on the glass window 101) that are oriented relative to each other such that a beam from the light source 100 is reflected by the scanning reflector 106 to the fixed reflector 108, and reflected light from the fixed reflector is reflected again by the scanning reflector and directed along the line of sight 138 through the lens 104. The scanning reflector 106 is moveable relative to the source 100, the lens 104 and the fixed reflector 108, to adjust the focus of the beam along the line of sight 138.

According to enhancements provided by the present invention, the integrated optical assembly is configured to produce a reference beam that is related to the optical characteristics of the scanning reflector 106, or to changes in position or orientation of the scanning reflector relative to the source (i.e. the fiber tip 100). That reference beam is useful in several ways in an IOA of the type shown in Goodwin and in FIG. 1. For example, if the scanning reflector 106 orientation were to shift from its intended orientation (due e.g. to thermal expansion), or if characteristics of the scanning reflector (e.g. the index of refraction of the scanning reflector), were to change on account of temperature changes, the reference beam (which is detected by the detector and processed by the control unit shown in FIG. 5) can be used to provide data that can be used to account for such changes. In addition, if the scanning reflector 106 were to be positioned in an orientation other than the orientation desired, the reference beam can be used in identifying and correcting that positioning. Essentially, the reference beam can be used to subtract out errors that could be caused by the foregoing factors.

Figure 2:
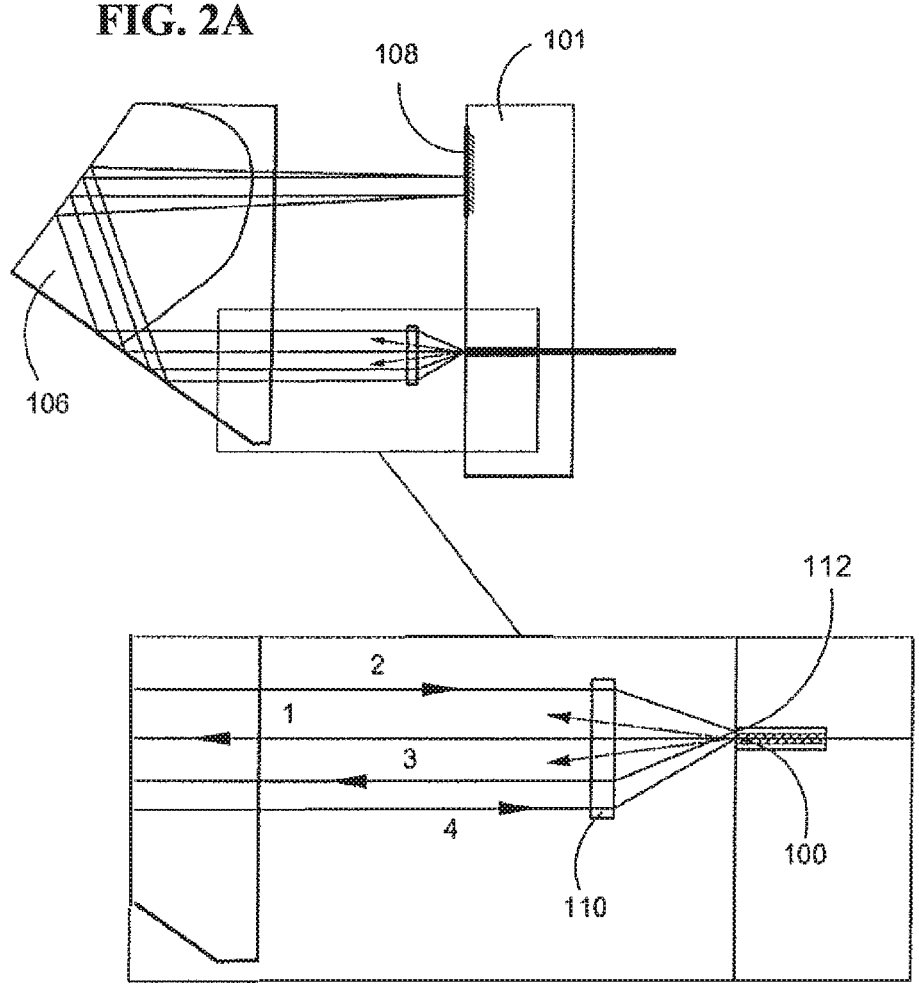
FIG. 2A is a schematic illustration of one version of an enhancement to the IOA of Goodwin, according to the present invention.
FIG. 2B is an enlargement of a portion of FIG. 2A.

FIGS. 2A, 2B show one version of an IOA configured to produce such a reference signal, according to the present invention. The optical assembly includes a lens 110 between the source 100 and the scanning reflector 106 that is configured to produce a continuous collimated reference signal that traverses the scanning reflector 106 at least twice and is then refocused on the source 100. The lens 110 is oriented off center, in relation to the source 100, to collimate the beam at a slight angle to the source, and the optical assembly is further configured so that after two passes through the scanning reflector, the reference signal is refocused on a reflector 112 (e.g. a window, ferrule, etc) next to the source 100, traverses the scanning reflector 106 twice more and is then refocused on the source 100.

The underlying principle of this version is to use the off-center lens 110 to collimate the beam at a slight angle to the fiber axis (and return mirror normal), so that after one pass, it is refocused on the reflector 112 next to the fiber tip 100. After that reflection, the beam traverses the corner cube system a second time and is then focused on the fiber tip 100 as the reference beam. This focusing happens automatically and is simply a property of the imaging system; no particularly difficult alignment is needed.

With the version of the present invention shown in FIGS. 2A and 2B, a stable and sensitive reference beam is provided throughout the focus range by the double pass collimated reference path, which traverses the scanning retroreflector four times. In FIGS. 2A and 2B, the offset of lens 110 is exaggerated somewhat for a visualization purposes. It is possible to also include annular reflective regions 110a, 110b on the lens 110 (FIG. 3) to increase the efficiency of the ghost, while not limiting the power used by the measurement beam. Further more, the lens 110 could be mounted directly in a recess cut into the window 101 (or mirror 108), which could include the needed offset Another modification, shown in FIG. 2A, is to use a reflective ferule 112, or to place a reflector very close to the fiber tip 100 since this will allow the lens to be smaller.

Figure 3:
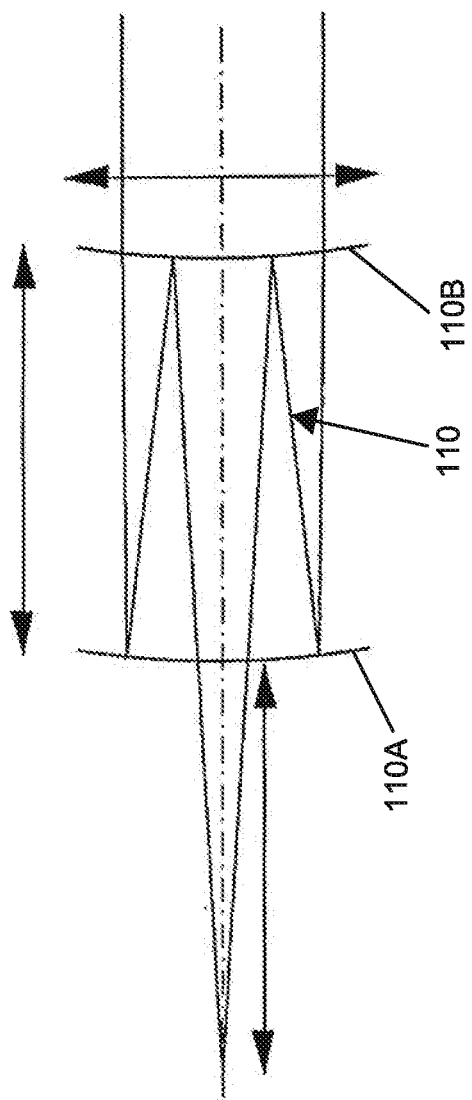
FIG. 3 is a schematic illustration of beam paths (and some modifications thereof) that can be used in the version of FIGS. 2A, 2B.

As schematically illustrated in FIGS. 2A, 2B and 3, the double pass configuration achieves the right amount of sensitivity needed to compensate the range measurement. The collimated reference beam allows the system to maintain high power at all ranges. The lens 110 or any other optical element that generates the collimated beam, must also allow a non-collimated measurement beam to pass through at the same time. This could be accomplished with a Fresnel zone plate or some other holographic lens, but another approach is to use a zero-power lens, that also has a collimated ghost reflection (see e.g. FIG. 3). Such lens designs have zero power for the twice refracted path, but the twice reflected path, referred to as the ghost path, is collimated by virtue of a finite focal length.

It is possible to also include the annular reflective regions 110a, 110b on the lens 110 (FIG. 3) to increase the efficiency of the ghost, while not limiting the power used by the measurement beam. This results in an annular reference beam. Furthermore, the lens could mounted directly in a recess cut into the window (or mirror), which could include the needed offset This would make a reflective ferule 112, and other methods for placing a reflector very close to the fiber tip 100, attractive since this will allow the lens 110 to be smaller.

A consequence of having a window near the fiber tip 100 that is substantially parallel (doesn't have to be perfect) to the return mirror, is that this path can be used to generate a reference signal at one focus position.

Figure 4:
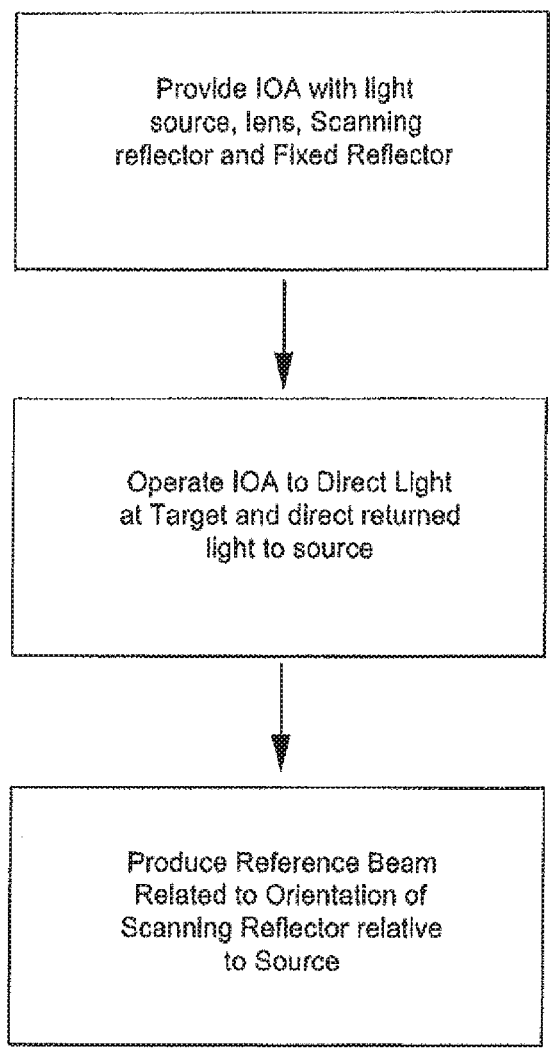
FIG. 4 is a schematic illustration of the steps of a method according to the present invention.

As schematically shown in FIG. 4, in a method according to the present invention the optical assembly includes the lens, the scanning reflector and the fixed reflector oriented relative to each other such that a beam from the light source is reflected by the scanning reflector to the fixed reflector, and reflected light from the fixed reflector is reflected again by the scanning reflector and directed along the line of sight through the lens, and wherein the scanning reflector is moveable relative to the source, the lens and the fixed reflector, to adjust the focus of the beam along the line of sight. The optical assembly directs a measurement beam at a target, and returned light is transmitted to the detector and processed by the control unit, while the reference beam is produced that is related to the orientation of the scanning reflector relative to the source. That reference beam is useful in several ways in an IOA of the type shown in Goodwin and in FIG. 1. For example, if the scanning reflector orientation were to shift from its intended orientation (due e.g. to thermal expansion) or if characteristics of the scanning reflector (e.g. the index of refraction of the scanning reflector) were to change on account of temperature changes, the reference beam can be used to provide data that can be used to account for such changes. In addition, if the scanning reflector were to be positioned in an orientation other than the orientation desired, the reference beam can be used in identifying and correcting that positioning. Essentially, the reference beam can be used to subtract out errors that could be caused by such factors.

Thus, the reference beam can be used to produce data to account for changes in the reflection or refraction characteristics of the scanning reflector due to (i) changes in the intended orientation of the scanning reflector, (ii) changes in the angular orientation of the scanning reflector, changes in the temperature of the scanning reflector.

The method can be practiced, e.g. by producing between the scanning reflector and the source a continuous collimated reference signal that traverses the scanning reflector at least once (and preferably 4 times, as shown in FIGS. 2A, 2B) and is then refocused on the source. As shown in FIGS. 2A, 2B, the beam is collimated at a slight angle to the source, and the optical assembly is configured so that after two traversals of the scanning retroreflector, the reference beam is refocused on a reflector next to the source, and after reflection, the beam traverses the scanning reflector a third and fourth time and is then refocused on the source (see e.g. FIGS. 2A, 2B).

Figure 7:
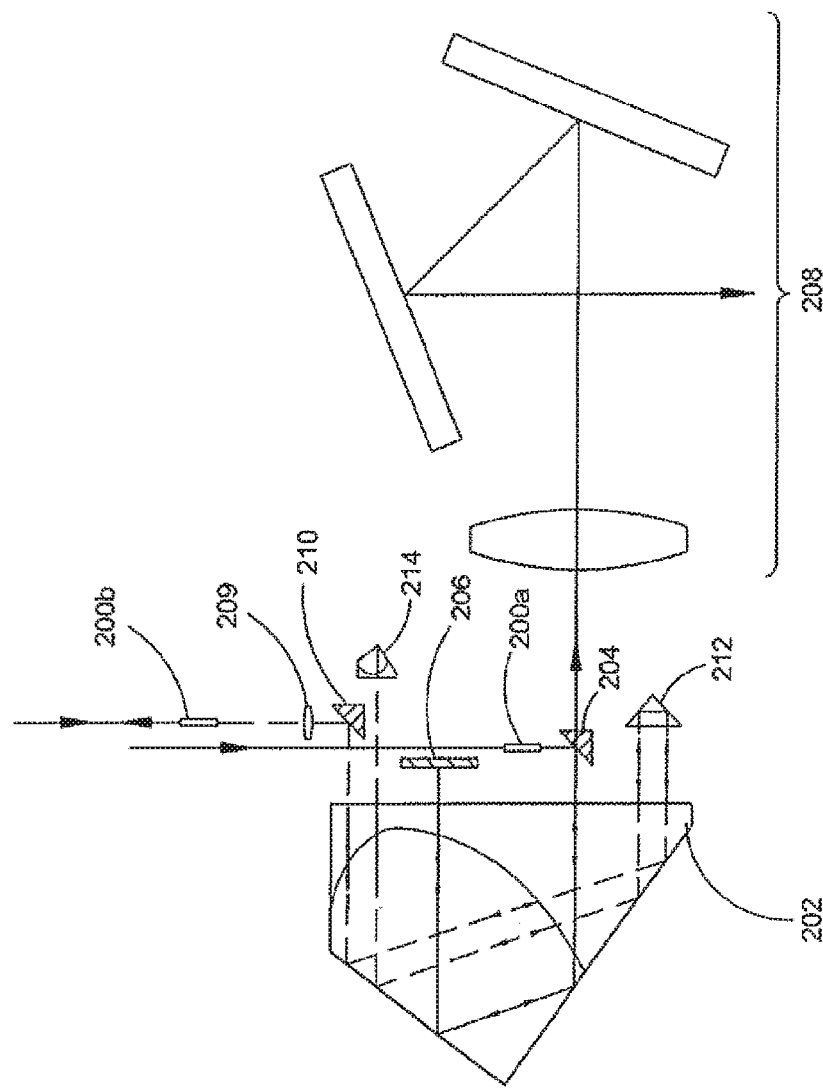
FIGS. 7-9 schematically show an alternative configuration for an optical assembly implementing the present invention.
Figure 8:
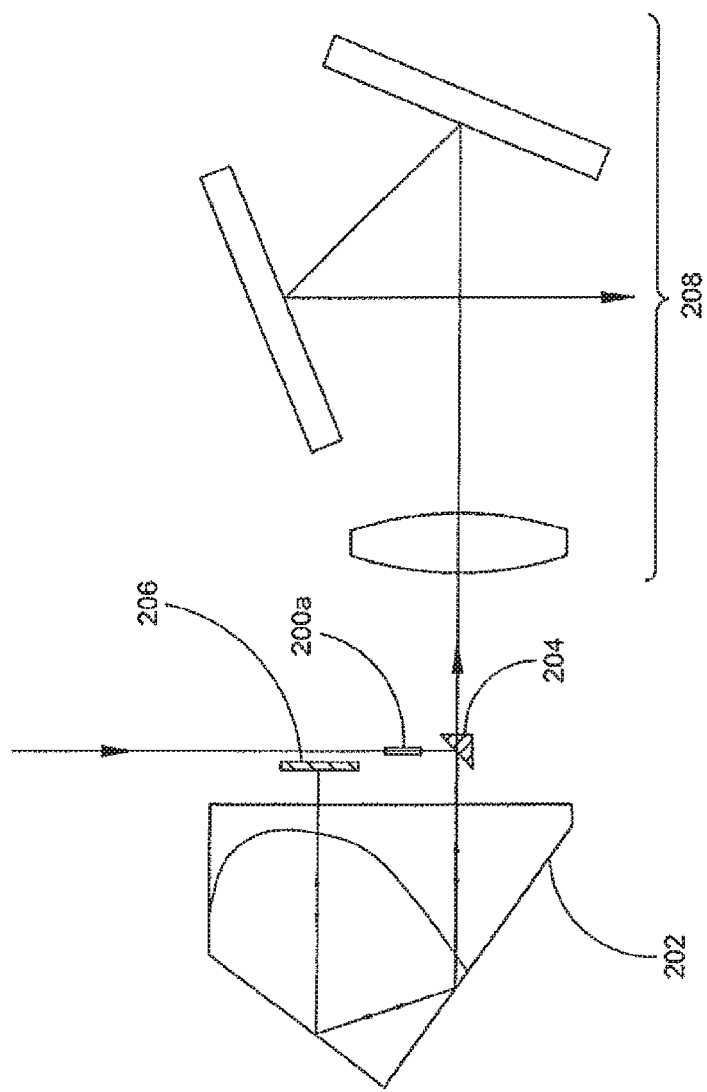
Figure 9:
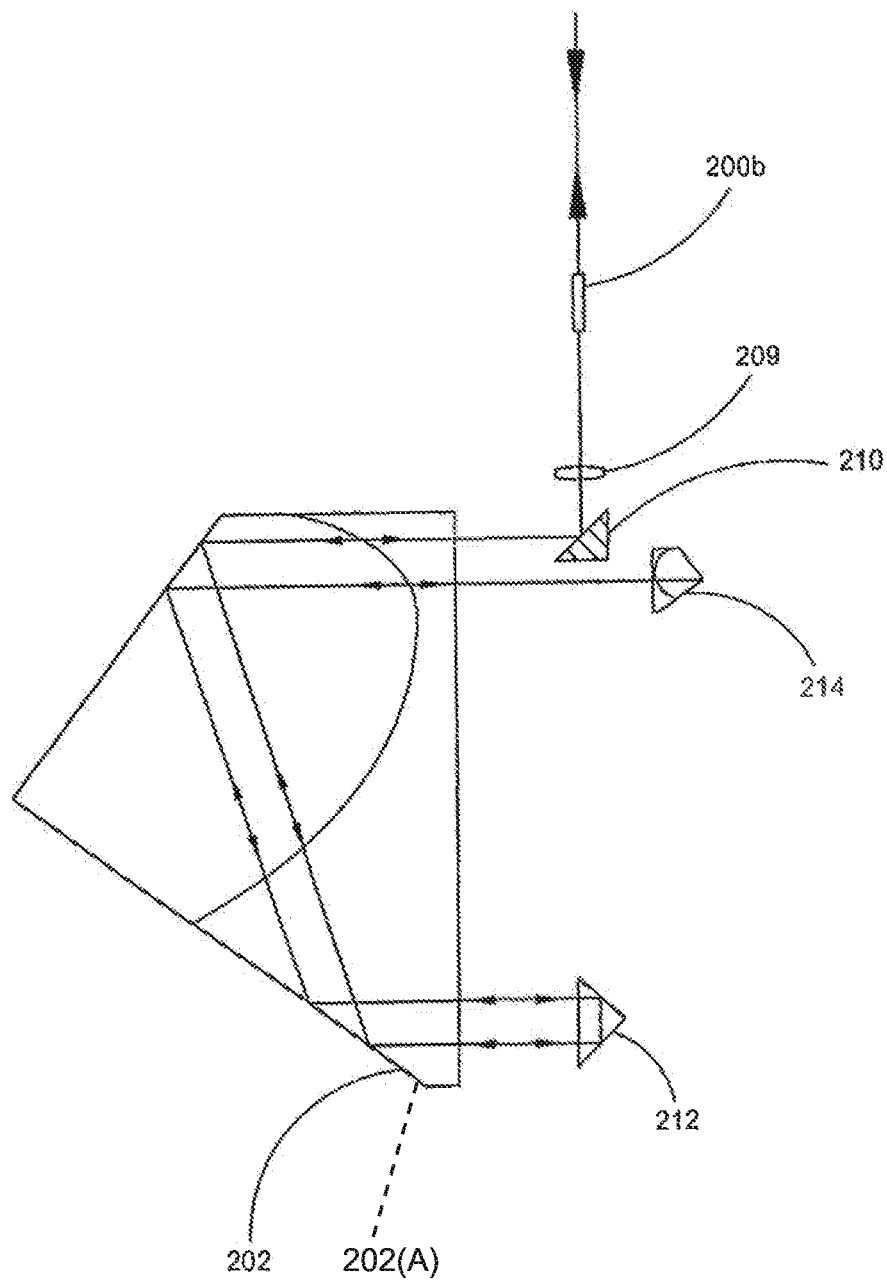

The method of the invention can also be implemented in the manner schematically shown in FIGS. 7-9. FIG. 7 schematically shows the primary components of that implementation; FIG. 8 shows the path of the measurement beam of that implementation, and FIG. 9 shows the path of the reference beam in that implementation. In implementation of FIGS. 7-9, the measurement and reference beams are directed through a pair of fibers having tips 200a, 200b, respectively. Thus, the measurement and reference beams that are directed through the pair of fibers effectively comprise the "source" (and both those measurement and reference beams can originate from the same light source that is split into the measurement and reference beams). As seen from FIGS. 7 and 8, the measurement beam from fiber tip 200a, is reflected by a fold mirror 204, traverses the scanning retroreflector 202 (which is preferably a moveable corner cube), is reflected by a fixed reflector 206, traverses the scanning retroreflector 202 again, and is directed along the line of sight through one or more lens and reflecting elements 208. Thus, the path of the measurement beam is the same as shown and described in connection with FIG. 1. As seen from FIGS. 7 and 9, the reference beam from fiber 200b, is directed through a lens 209, reflected by a fold mirror 210, traverses the scanning retroreflector 202, is reflected by a prism 212 or some other suitable optical element that shifts the reference beam, traverses the scanning retroreflector 202 again, is reflected by a small fixed retroreflector 214 that reflects that reference beam on axis back to the scanning retroreflector 202 which it traverses again and is then reflected back to the reference beam fiber tip 200b. Thus, the reference beam is a collimated reference signal that traverses the scanning retroreflector 202 at least twice and is then refocused on the source (in the embodiment, on the reference beam fiber tip 200b).

Thus, the present invention provides enhancements to an IOA of the type that is particularly useful in a laser radar system. The enhancement of the present invention provides an IOA (and also to a method) that produces a reference beam that is related to the optical characteristics of the scanning reflector, or to changes in position or orientation of the scanning reflector relative to the source. With the foregoing disclosure in mind, the manner in which such enhancements may be implemented in various types of IOA assemblies will be apparent to those in the art.

The reference path of IOA assemblies described here must traverse the scanning reflector at least once, and in all cases it is possible for the reference beam and measurement beam to be measurement beams of separate interferometers having internal references of their own. The a reference interferometer will have a path length that increases with the position of the scanning reflector, where the increase is in proportion to twice the number of traversals that it makes (2nx) where x is the change in position of the scanning reflector and n is the number of traversals, with the minimum number of traversals being one. The measurement interferometer path also increases with scanning reflector position but by a factor of 8×. So the measurement path can be compensated for scanning reflector shifts by subtracting the change in measurement path times a factor of 4/n.

The preferred embodiment is to allow the reference beam to interfere with the measurement beam so that the reference beam and measurement beam form an interferometer with the position of the scanning reflector contributing minimally to the path difference between the reference beam and measurement beams. This occurs only when the reference beam makes four traversals of the scanning reflector as described, for example, in FIGS. 2A and 2B.

In the disclosed embodiments, the measurement path and reference path use the same corner cube (106, 202). However the corner cube of the measurement path may be different than the corner cube of the reference path. For example, with reference to FIG. 9, in some embodiments the assembly may comprise a corner cube 202A in the path of the reference beam. Therefore the movement of the corner cube 202 of the measurement path may have synchronized movement with the corner cube 202A of the reference path.

Next, explanations will be made with respect to a structure manufacturing system provided with the measuring apparatus (laser radar system 200) described hereinabove.

Figure 10:
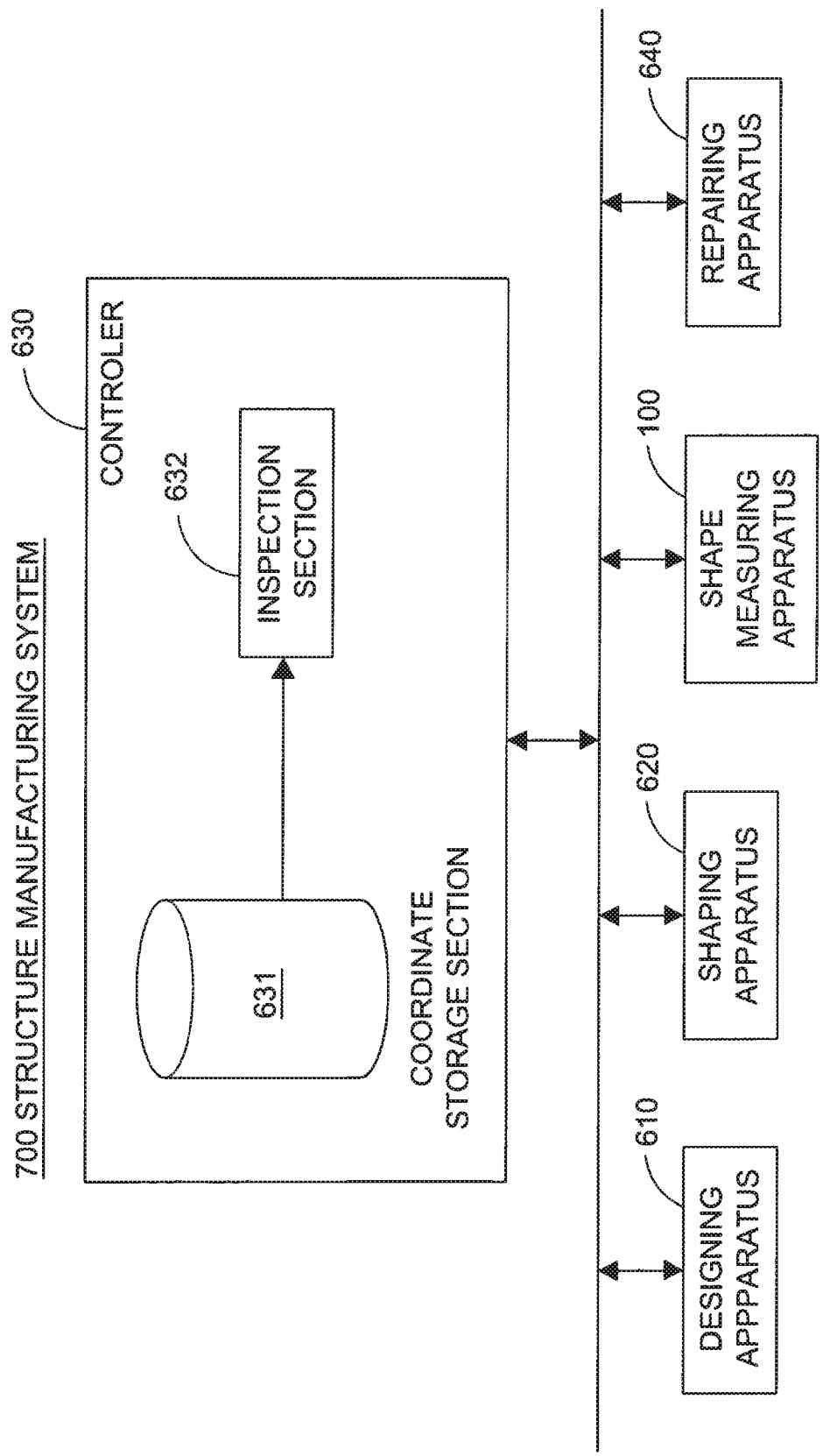
FIG. 10 is a block diagram of a structure manufacturing system 700.

FIG. 10 is a block diagram of a structure manufacturing system 700. The structure manufacturing system is for producing at least a structure from at least one material such as a ship, airplane and so on, and inspecting the structure by the profile measuring apparatus 200. The structure manufacturing system 700 of the embodiment includes the profile measuring apparatus 200 as described hereinabove in the embodiment, a designing apparatus 610, a shaping apparatus 620, a controller 630 (inspection apparatus), and a repairing apparatus 640. The controller 630 includes a coordinate storage section 631 and an inspection section 632.

The designing apparatus 610 creates design information with respect to the shape of a structure and sends the created design information to the shaping apparatus 620. Further, the designing apparatus 610 causes the coordinate storage section 631 of the controller 630 to store the created design information. The design information includes information indicating the coordinates of each position of the structure.

The shaping apparatus 620 produces the structure based on the design information inputted from the designing apparatus 610. The shaping process by the shaping apparatus 620 includes such as casting, forging, cutting, and the like. The profile measuring apparatus 200 measures the coordinates of the produced structure (measuring object) and sends the information indicating the measured coordinates (shape information) to the controller 630.

The coordinate storage section 631 of the controller 630 stores the design information. The inspection section 632 of the controller 630 reads out the design information from the coordinate storage section 631. The inspection section 632 compares the information indicating the coordinates (shape information) received from the profile measuring apparatus 200 with the design information read out from the coordinate storage section 631. Based on the comparison result, the inspection section 632 determines whether or not the structure is shaped in accordance with the design information. In other words, the inspection section 632 determines whether or not the produced structure is nondefective. When the structure is not shaped in accordance with the design information, then the inspection section 632 determines whether or not the structure is repairable. If repairable, then the inspection section 632 calculates the defective portions and repairing amount based on the comparison result, and sends the information indicating the defective portions and the information indicating the repairing amount to the repairing apparatus 640.

The repairing apparatus 640 performs processing of the defective portions of the structure based on the information indicating the defective portions and the information indicating the repairing amount received from the controller 630.

Figure 11:
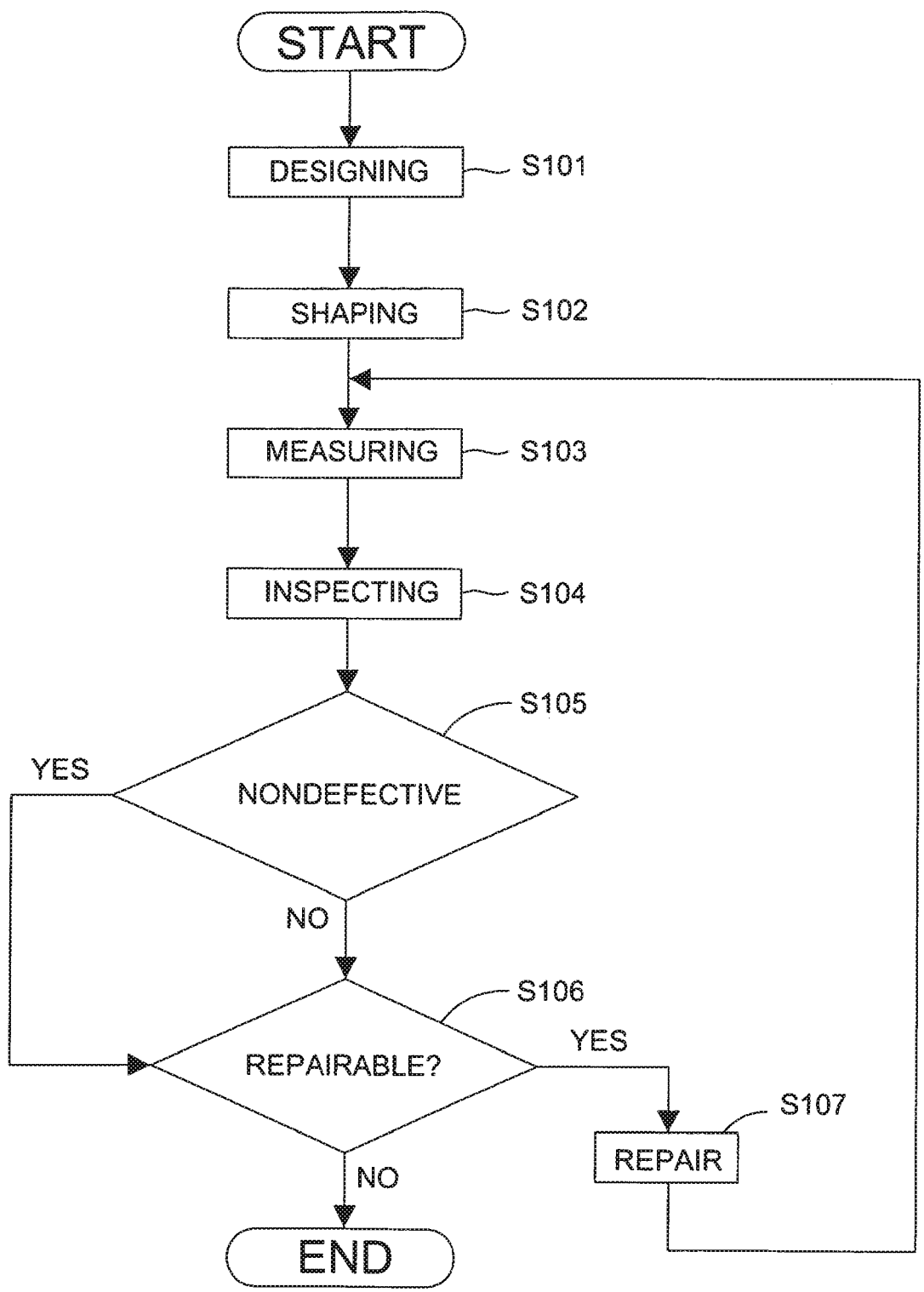
FIG. 11 is a flowchart showing a processing flow of the structure manufacturing system 700.

FIG. 11 is a flowchart showing a processing flow of the structure manufacturing system 700. With respect to the structure manufacturing system 700, first, the designing apparatus 610 creates design information with respect to the shape of a structure (step S101). Next, the shaping apparatus 620 produces the structure based on the design information (step S102). Then, the profile measuring apparatus 100 measures the produced structure to obtain the shape information thereof (step S103). Then, the inspection section 632 of the controller 630 inspects whether or not the structure is produced truly in accordance with the design information by comparing the shape information obtained from the profile measuring apparatus 200 with the design information (step S104).

Then, the inspection portion 632 of the controller 630 determines whether or not the produced structure is nondefective (step S105). When the inspection section 632 has determined the produced structure to be nondefective ("YES" at step S105), then the structure manufacturing system 700 ends the process. On the other hand, when the inspection section 632 has determined the produced structure to be defective ("NO" at step S105), then it determines whether or not the produced structure is repairable (step S106).

When the inspection portion 632 has determined the produced structure to be repairable ("YES" at step S106), then the repair apparatus 640 carries out a reprocessing process on the structure (step S107), and the structure manufacturing system 700 returns the process to step S103. When the inspection portion 632 has determined the produced structure to be unrepairable ("NO" at step S106), then the structure manufacturing system 700 ends the process. With that, the structure manufacturing system 700 finishes the whole process shown by the flowchart of FIG. 11.

With respect to the structure manufacturing system 700 of the embodiment, because the profile measuring apparatus 200 in the embodiment can correctly measure the coordinates of the structure, it is possible to determine whether or not the produced structure is nondefective. Further, when the structure is defective, the structure manufacturing system 700 can carry out a reprocessing process on the structure to repair the same.

Further, the repairing process carried out by the repairing apparatus 640 in the embodiment may be replaced such as to let the shaping apparatus 620 carry out the shaping process over again. In such a case, when the inspection section 632 of the controller 630 has determined the structure to be repairable, then the shaping apparatus 620 carries out the shaping process (forging, cutting, and the like) over again. In particular for example, the shaping apparatus 620 carries out a cutting process on the portions of the structure which should have undergone cutting but have not. By virtue of this, it becomes possible for the structure manufacturing system 700 to produce the structure correctly.

In the above embodiment, the structure manufacturing system 700 includes the profile measuring apparatus 200, the designing apparatus 610, the shaping apparatus 620, the controller 630 (inspection apparatus), and the repairing apparatus 640. However, present teaching is not limited to this configuration. For example, a structure manufacturing system in accordance with the present teaching may include at least the shaping apparatus and the profile measuring apparatus.

Additional Disclosure

Embodiments of the laser radar system 300 according to the present invention will be explained below with reference to the drawings. However, the present invention is not limited thereto.

The present embodiments provides a compact optical assembly (sometimes referred to as an Integrated Optical Assembly, or IOA), that is useful in a laser radar system, and is also useful in various other optical systems.

In a laser radar system, the optical assembly is configured to move as a unit with the laser radar system, as the laser radar system is pointed at a target, and eliminates the need for a large scanning (pointing) mirror that is moveable relative to other parts of the laser radar system.

The optical assembly is designed to be compact, and to utilize a relatively simple assembly of elements for directing and focusing a pointing beam and a measurement beam at an outlet of the optical radar system.

An optical system according to a first embodiment comprises catadioptric optical optics that is moveable as a unit with the laser radar, and directs both a pointing beam and a measurement beam at a target at which the laser radar system is pointed, while eliminating the need for a scanning (pointing) mirror that is moveable relative to other components of the laser radar to direct the pointing beam. The pointing beam is produced in a visible (e.g. red such as around 610 nm to 750 nm) wavelength range, and the measurement beam is produced in a different, predetermined wavelength range (e.g. infrared such as around 0.7 µm to 10 µm, or IR). The pointing and measurement beams are handled by the compact optical assembly of the present embodiment which moves as a unit with the laser radar system, to direct the pointing and measurement beams from the laser radar system (and at the target), in a manner that avoids use of a scanning (pointing) mirror that is moveable relative to other components of the laser radar.

The optical assembly includes catadioptric optics that include a concave mirror that provides most of the optical power, and allows easier achromatization between the two required wavelengths. The concave mirror folds the optical path onto itself, reducing the overall size of the optical assembly substantially. The size of the optical assembly is designed to be small enough to allow a camera to be located on the moving part of the laser radar system, and eliminates parallax effects by use of a reflective window or cold mirror that allows the camera optical axis to be collinear with the axis of the measurement beam. The concave mirror helps achromatize the system, while also folding the optical path to create a compact optical system which allows the entire optical assembly to be rotated as a unit with the laser radar system for scanning, eliminating the expensive and troublesome rotating (pointing) mirror of the existing system.

Basically, the first embodiment comprises an optical assembly moveable as a unit as part of a laser radar system, and configured to direct a pointing beam and a measurement beam through an outlet of the laser radar system. The optical assembly includes catadioptric optics configured to fold the optical path of the pointing beam and measurement beam that is being directed through the outlet of the laser radar system, to compress the size of the optical assembly.

The first embodiment can be implemented in various ways. For example, the optical assembly includes a window with a transmissive portion through which the pointing beam and measurement beam are directed to the outlet of the laser radar system. A relay system directs the pointing beam and measurement beam from an optical fiber to a reflective area of the window, and the catadioptric optics receive and reflect the pointing beam and measurement beam from the reflective area of the window back through a transmissive portion the window, to fold the optical path of the pointing beam and measurement beam that is being directed through the outlet of the laser radar system, to compress the size of the optical assembly. The concave mirror folds the optical path onto itself. In other words, part of the optical path overlaps. As for the optical path for the measurement beam, the optical path between concave mirror and reflective area of the window overlaps. In other words, optical assembly has more than two derections of a light from light source.

In one specific version of this implementation, the optical assembly includes at least one moveable optic to vary focus of the pointing beam and the measurement beam that is reflected by the catadioptric optics and directed back through the transmissive portion of the window. In another specific version, the focus of the pointing beam and measurement beam that is reflected by the catadioptric optics and directed back through the transmissive portion of the window is changed by moving a plurality of optics, the plurality of optics characterized by low optical power but a large amount of spherical aberration.

In another implementation of the first embodiment the window comprises a cold mirror that transmits light in a predetermined wavelength range that includes the wavelength range of each of the pointing and measurement beams, and an optical fiber that transmits the pointing beam and the measurement beams is located at a central location of the cold mirror. The catadioptric optics receive the pointing beam and the measurement beam from the optical fiber and reflect the pointing beam and the measurement beam back through the cold mirror, where it is directed to the outlet of the laser radar system. The camera 340 is placed such that it accepts light reflected by the coating on cold mirror 322, allowing the line of site of the camera to be collinear with the axis of the measurement and pointing beams. The cold mirror 322 allows the camera optical axis to be collinear with the axis of the measurement beam.

In one specific version of this implementation, the optical assembly includes at least one moveable optic to vary focus of the pointing beam and the measurement beam that is reflected by the catadioptric optics and directed back through the cold mirror. In another specific version, the focus of the pointing beam and measurement beam that is reflected by the catadioptric optics and directed back through the cold mirror is changed by moving a plurality of optics, the plurality of optics characterized by low optical power but a large amount of spherical aberration.

According to a basic aspect of a second embodiment of the present invention, the optical assembly is configured to direct a pointing beam and a measurement beam along a line of sight and through an outlet of the laser radar system. The optical assembly comprises a light source, a lens, a scanning reflector and a fixed reflector that co-operate to focus the pointing and measurement beams from the light source along a line of sight that extends through the lens. The light source, the lens, the scanning reflector and the fixed reflector are oriented relative to each other such that the pointing and measurement beams from the light source are reflected by the scanning reflector to the fixed reflector, and reflected pointing and measurement beams from the fixed reflector are reflected again by the scanning reflector and directed along the line of sight through the lens, and the scanning reflector is moveable relative to the source, the lens and the fixed reflector, to adjust the focus of the pointing and measurement beams along the line of sight.

According to a preferred version of the second embodiment, the scanning reflector comprises a retroreflector, and the fixed reflector comprises a plane mirror. The source, the lens and the plane mirror are all in fixed locations relative to a support structure for the optical assembly, and the retroreflector is moveable relative to those fixed locations, to vary the focus of the pointing and measurement beams along the line of sight.

The following description also provides several versions of the optical assembly of the second embodiment. In one version, the retroreflector comprises a corner cube that has at least three reflective surfaces that are oriented so that (i) the pointing and measurement beams from the source are reflected through the corner cube to a plane mirror, (ii) the pointing and measurement beams reflected from the plane mirror are again reflected through the corner cube, and (iii) movement of the corner cube in at least one predetermined direction adjusts the focus of the pointing and measurement beams along the line of sight, in a manner that is substantially unaffected by movement of the corner cube in directions transverse to the predetermined direction or by rotations of the corner cube relative to the predetermined direction.

In another version of an optical assembly according to the second embodiment, the scanning reflector comprises a reflective roof that provides two reflections of the pointing and measurement beams, and the fixed reflector comprises a reflective roof that also provides two reflections of the pointing and measurement beams, where the nodal lines of both reflective roofs are in a predetermined orientation relative to each other.

The following detailed description also provides concepts for configuring and orienting the components of the optical assembly (e.g. for the second embodiment). Those concepts are designed, e.g. to reduce the weight of the optical assembly, and improve the performance of the optical assembly, while keeping the optical assembly as compact as possible.

In one concept, the pointing and measurement beams reflected by the scanning reflector and directed along the line of sight through the lens, are reflected by a fold mirror that folds the line of sight of the pointing and measurement beams directed through the lens. The source comprises an optical fiber supported by the fold mirror.

In another concept, the lens, the beam source and the plane mirror are supported in a manner such that they can move as a unit relative to the retroreflector, and wherein the line of sight moves with the unit.

In still another concept, the pointing and measurement beams reflected by the scanning reflector and directed along the line of sight through the lens are reflected by a polarization beam splitter that folds the line of sight of the pointing and measurement beams directed through the lens, and wherein the source comprises an optical fiber in a predetermined location relative to the polarization beam splitter that folds the line of sight of the pointing and measurement beams directed through the lens.

In yet another concept, the source comprises an optical fiber supported by a monolithic member that has a portion that functions as the plane mirror and another portion that folds the line of sight of the pointing and measurement beams reflected by the scanning reflector and directed along the line of sight through the lens.

In still another concept, the source comprises an optical fiber supported by a transmissive member that also supports the plane mirror.

First Embodiment

As described above, the present invention provides an optical assembly that is moveable as a unit with a laser radar system, and is configured to transmit a pointing beam and a measurement beam from the laser radar system, where they can be directed at a target at which the laser radar system is pointed. The present invention is described herein in connection with a laser radar system of the type described in U.S. Pat. Nos. 4,733,609, 4,824,251, 4,830,486, 4,969,736, 5,114,226, 7,139,446, 7,925,134, and Japanese Patent #2,664,399, which are incorporated herein by reference, and from that description, the manner in which the present invention can be implemented with various types of laser radar systems will be apparent to those in the art.

Figure 13:
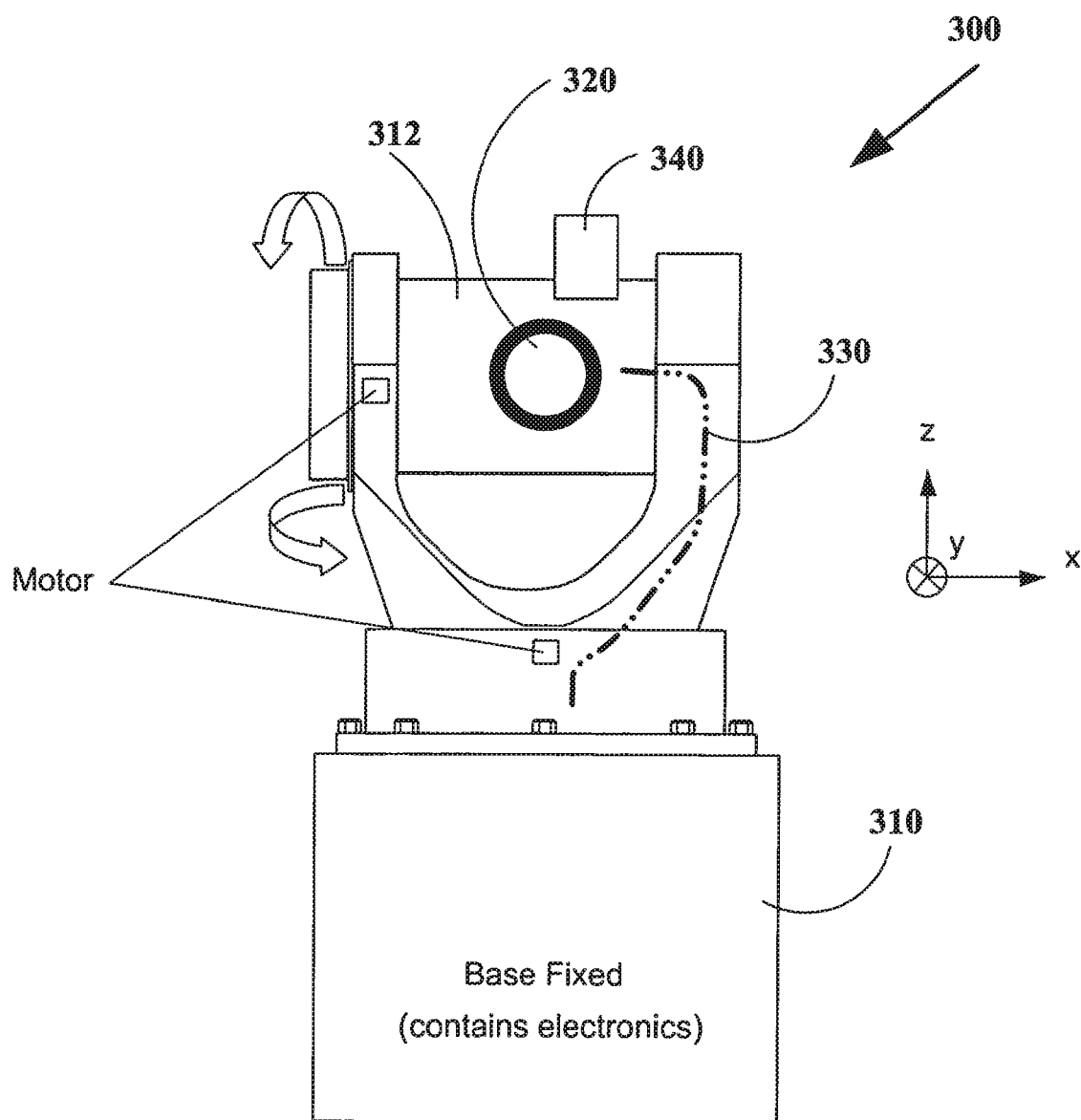
FIG. 13 is a front view of a preferred type of laser radar system that can employ an optical assembly according to another embodiment.

FIGS. 12 and 13 show a laser radar system that includes all of the embodiments disclosed in this application. As shown in FIGS. 12 and 13, a laser radar system 300 produces a point beam in a visible (e.g. red) wavelength range, and a measurement beam in a different (e.g. infrared, IR) wavelength range, and directs (transmits) the pointing and measurement beams to an outlet 320 of the laser radar system. The pointing beam is used to identify a point on a target 306 at which the measurement beam is directed. The laser source of the pointing beam and the measurement beam is different. A control unit can control a laser radar system 300. In this embodiment, the laser radar system 300 has a control unit. However a separate system coupled with the laser radar system 300 may have the control unit.

The measurement beam may pass through a splitter 302 which directs the measurement beam (and the pointing beam) along a measurement path 304 and at the target 306, and sends a portion of the measurement beam through a circuit 308 where that portion of the laser beam is processed in a manner described in U.S. Pat. Nos. 4,733,609, 4,824,251, 4,830,486, 4,969,736, 5,114,226, 7,139,446, 7,925,134, and Japanese Patent #2,664,399. In FIG. 12, that splitter is the bottom splitter identified by 302. The measurment beam directed along the measurement path 304 is reflected from the target 306 and a portion of that reflected or scattered measurement beam is received back at the laser radar system 300, where it is directed to a detector by the top splitter shown in FIG. 12, detected and processed to provide information about the target 306. The detection and processing of the reflected or scattered radiation from the measurement beam is provided in a base 310 of the laser radar system 300, and is configured to detect and process the reflected radiation according to U.S. Pat. Nos. 4,733,609, 4,824,251, 4,830,486, 4,969,736, 5,114,226, 7,139,446, 7,925,134, and Japanese Patent #2,664,399, which are incorporated by reference and form no part of the present embodiments. Briefly, optical heterodyne detection provides a source light beam which is directed to a target 306 and reflected therefrom. The return light beam is then mixed with a local oscillator light beam on a photo detector to provide optical interference patterns which may be processed to provide detailed information about the target 306. Optical heterodyne techniques take advantage of the source and reflected light beam reciprocity. For example, these light beams are substantially the same wavelength and are directed over the same optical axis. Measurement path 304 and target path 304 is same. This provides an improved signal-to-noise ratio (SNR) and heightened sensitivity. The SNR is sufficiently high so that a small receiving aperture may be used, in contrast to known direct detection systems. A small receiver aperture may be envisioned as a very small lens capable of being inserted into limited access areas. Since a small receiver aperture can still provide detailed information about the target, the optical components of a coherent system may be made very small and provide related increases in scanning speed and accuracy. For example a coherent optical system using a one-half inch aperture can obtain more information about a target than a four inch aperture used in a direct optical detection system. The present invention is directed at the optical assembly by which the pointing beam and measurement beam are transmitted to the outlet 320 of the laser radar system.

In a known laser radar system, a moveable mirror is provided for directing the point beam at a target. The moveable mirror is separate from the optics that transmit the measurement beam, and requires a relatively large laser radar housing to accommodate both the moveable mirror and the laser radar optics. The present invention is relatively compact, because both the measurement beam and pointing beam are produced by a relatively compact optical assembly that can move as a unit with the laser radar system 100. Moreover, the optical assembly of the present invention is designed to be relatively stable in performing its beam transmission/reception functions. An electronic motor is provided for moving the optical assembly. In this embodiment, the optical assembly is movable for two axis relative to different direction. The two axis is located with YX plane and XY plane as shown in FIG. 13. The two axis are the Z axis and X axis. The encoder is provided for monitoring the position of the optical assembly. The control unit can control power of the electronic motor by the position of the optical assembly.

As shown in FIG. 13, the laser radar system 300 includes a housing (e.g. a rotatable cylinder 312) in which the optical assembly is located and secured, so that the optical assembly moves as a unit with the cylinder 312 relative to the base 310 of the laser radar system. The laser radar system includes an outlet 320 in the housing 312, and through which radiation (e.g. in the two wavelengths of the pointing and measurement beams) is directed from the laser radar system. The base 310 contains the processing features of the laser radar system, that are disclosed in U.S. Pat. Nos. 4,733,609, 4,824,251, 4,830,486, 4,969,736, 5,114,226, 7,139,446, 7,925,134, and Japanese Patent #2,664,399.

Figure 14A:
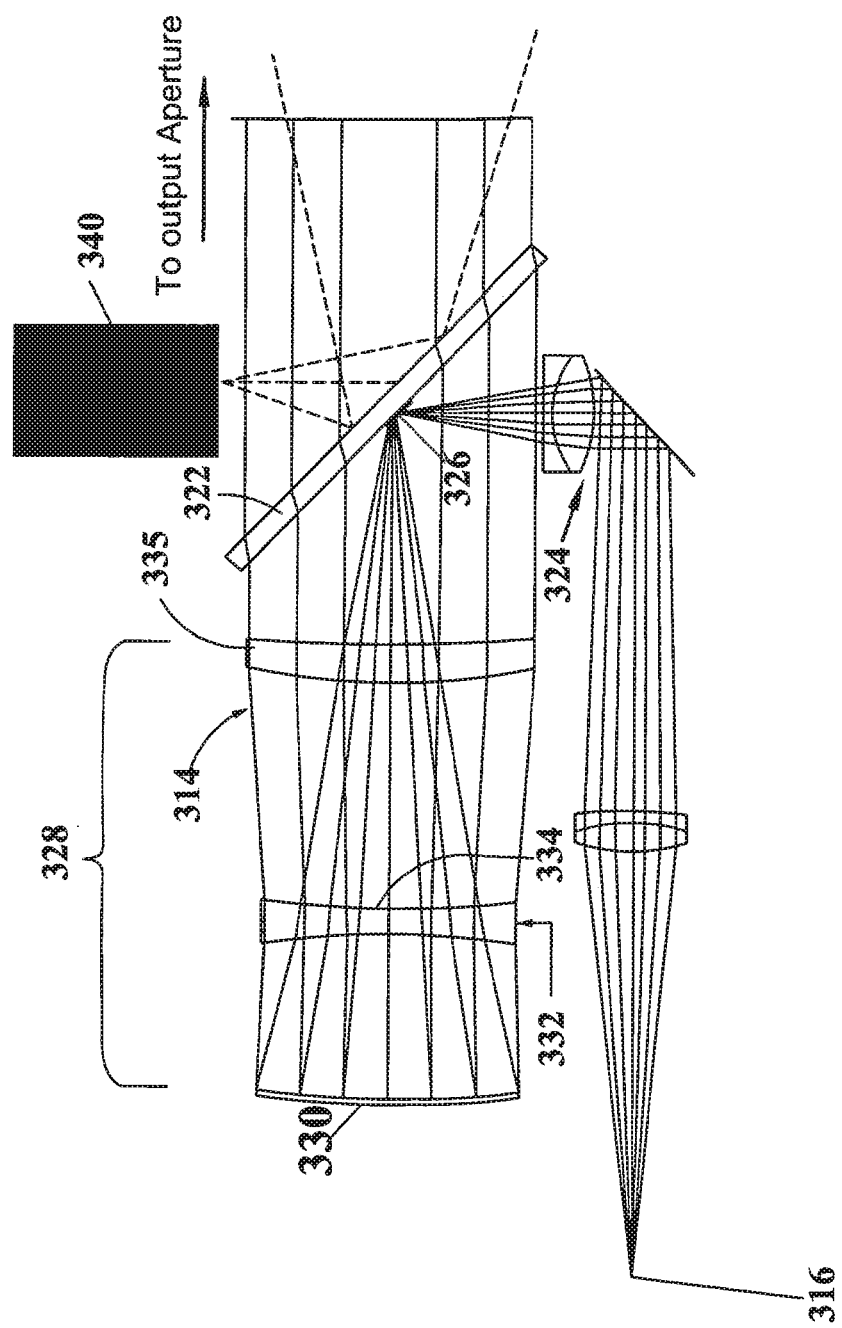
FIGS. 14A, 14B and 14C are examples of different versions of an optical assembly according to another embodiment.
Figure 14B:
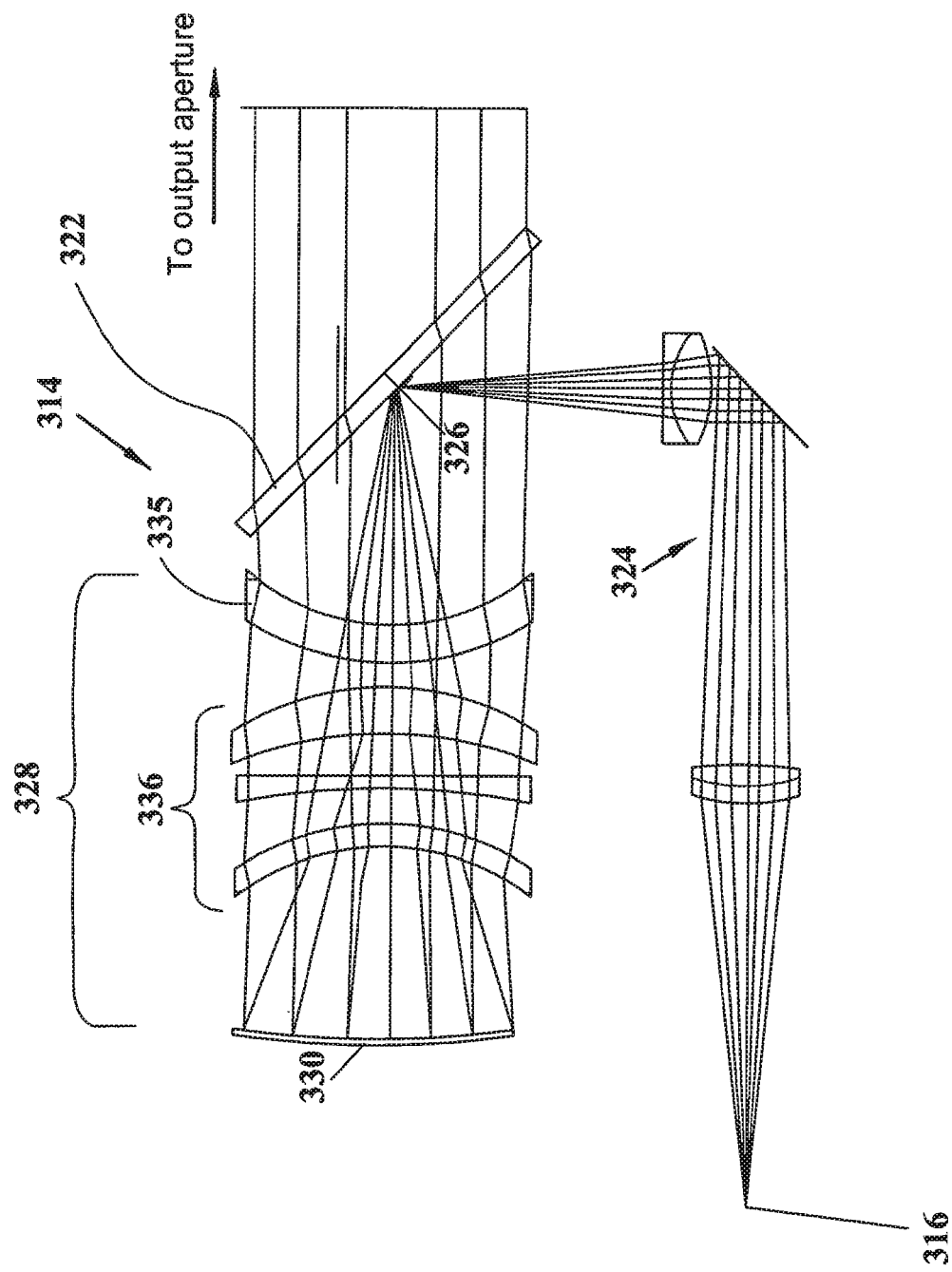
Figure 14C:
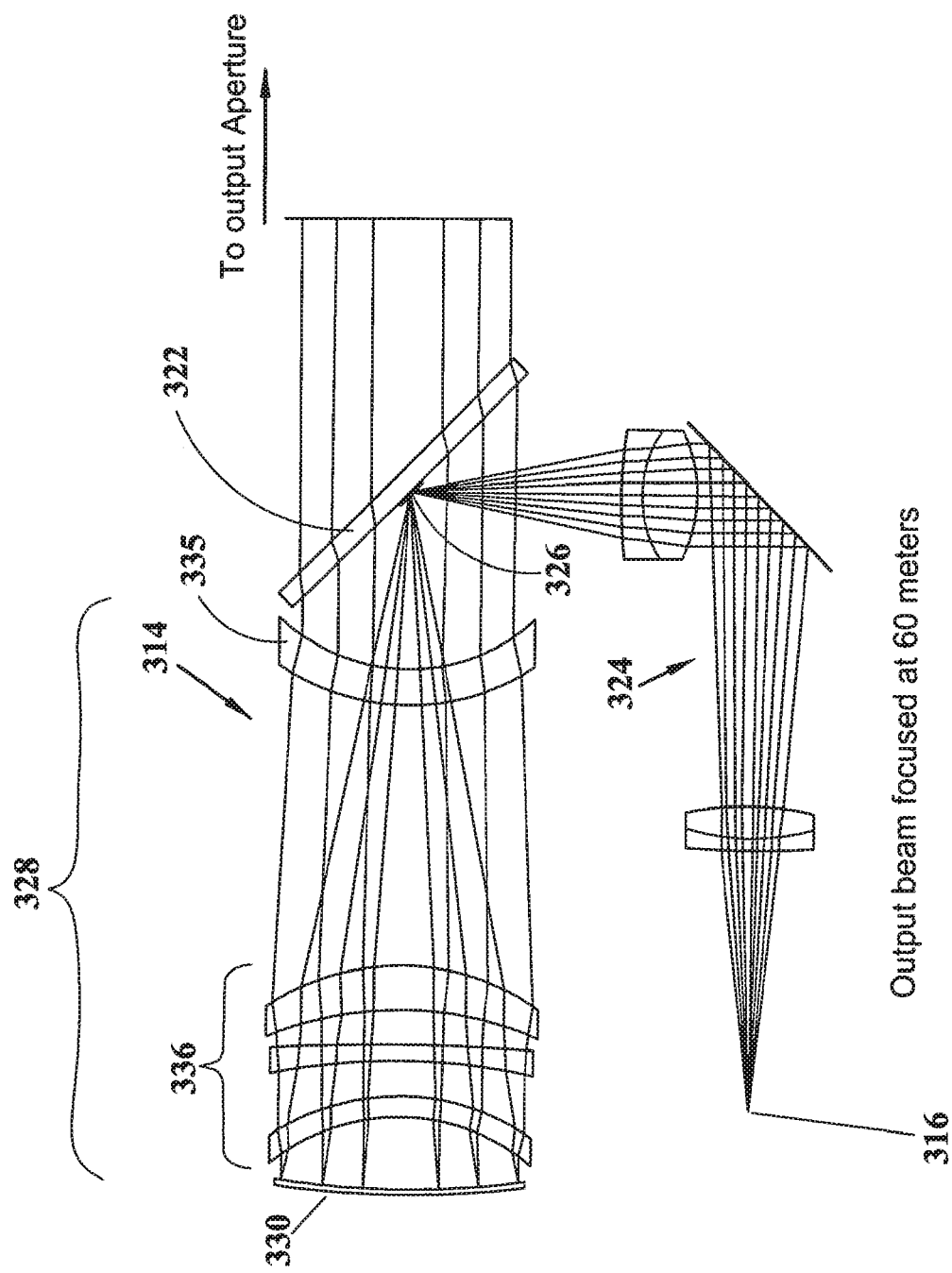

The basic features of an optical assembly 314 of a first embodiment of the present embodiments can be appreciated from FIGS. 14(A) through 14(C). In FIG. 14(A), the optical assembly 314 includes an optical fiber (represented by fiber tip 316) through which a pointing beam and measurement beam are transmitted, a relay system 324 that directs the pointing and measurement beams from the optical fiber 316 to a small reflective area 326 of a window 322 (also referred to as a fold mirror in the embodiments of FIGS. 14(A) through 14(C)), and catadioptric optics 328 that receive and reflect the pointing and measurement beams from the reflective area 326 of the window 322 back through the window 322, where it is directed through the outlet 320 of the housing 312. The window 322 has a small silvered area on one side that forms the reflective area 326, and a coating on its other side that allows radiation in the red and infrared range to be transmitted through the window and to the output aperture 320. The camera 340 is placed such that it accepts light reflected by the coating on window 322, allowing the line of site of the camera to be collinear with the axis of the measurement and pointing beams. It should be noted that while the location and orientation of camera 340 is shown in FIG. 14(A), the camera 340 could be similarly located and oriented relative to the window 322 in the versions of the first embodiments shown in FIGS. 14(B), 14(C) and 15.

In addition, the optical assembly 314 is configured to receive at least some radiation that is reflected or scattered from the target 306, and directs that radiation back through the fiber 316. The fiber 316 can have a fiber beam combiner that combines a pointing beam in the visible (e.g. red) wavelength range with the measurement beam in the different, e.g. infrared (IR) wavelength range. The pointing beam and measurement beams are generated from separate sources, and are combined by a fiber beam combiner located inside the base 310 in a manner well known to those in the art.

The laser radar system 300 of this embodiment has the pointing beam and measurement beam. However the laser radar system 300 may have the measurement beam without the pointing beam. For example, the measurement beam is in the visible. Therefore, in this case, the measurement beam can also be the pointing beam. The laser radar system 300 of this embodiment has the different wavelength region between the pointing beam and measurement beam. However the laser radar system 300 may have the same wavelength region such as the visible region.

In FIG. 14(A), the optical assembly 314 includes the relay system 324 that directs the pointing and measurement beams from the optical fiber 316 to the small reflective area 326 of the window 322, and catadioptric optics 328 that receive and reflect the pointing and measurement beams from the reflective area 326 of the window 322 back through the transmissive portion of the window 322, where it is directed through the outlet 320 of the housing. The catadioptric optics 328 include a spherical mirror 330 from which radiation (i.e. from the pointing and measurement beams) is reflected and one or more optics through which the radiation is directed. In the embodiment of FIG. 14(A), the optical assembly includes at least one moveable optic 332 to vary focus of the radiation that is reflected from the spherical mirror 330 and back through the window 322. The optic 332 may be bi concave, or may be plano concave, with at least one concave portion 334 facing the fold mirror 322. The moveable optic 332 is configured to focus the radiation reflected from the spherical mirror 330 at the target, and is also configured for reducing stray radiation reflected by transmissive lens surfaces (ghost images) from being directed back through the fiber 316. Specifically, the concave portion 334 of the optic 332 has a center of curvature that is far from the fiber conjugate, to reduce the likelihood of stray radiation reflected by lens surfaces being directed back through the fiber. Also, a lens 335 that is fixed in relation to the optical assembly corrects for spherical aberration, allowing for a diffraction limited focused spot at the target. The spherical mirror folds the optical path onto itself. In other words, part of the optical path overlaps. As for the optical path for the measurement beam, the optical path between concave mirror and reflective area 326 overlaps. In other words, the travel direction of light from light source changes in the optical assembly. The direction from reflective area 326 to concave mirror is different from the direction from concave mirror to reflective area 326. In another specific version of the first embodiment, shown in FIGS. 14B and 14C, the optical assembly includes a set 336 of optics that that can move as a group relative to the spherical mirror 330 and the window 322. In the embodiment of FIGS. 14B and 14C, the focus of the pointing beam and measurement beam that is reflected by the catadioptric optics and directed back through the window 322 is changed by moving the set 336 of optics, which are characterized by low optical power but a large amount of spherical aberration. Thus, in the example of FIG. 14B, the set of optics 336 are relatively close to the window 322 to provide focus at a short distance (e.g. about 1 meter), and in FIG. 14C the set of optics 336 are relatively close to the spherical mirror 330 to provide focus at a relatively longer distance (e.g. about 60 meters). The position of the moving group 336 is continuously variable between these two extremes, allowing the measurement beam and pointing beam to be focused at any distance between, for example, 1 and 60 meters from the laser radar optical assembly.

Figure 15:
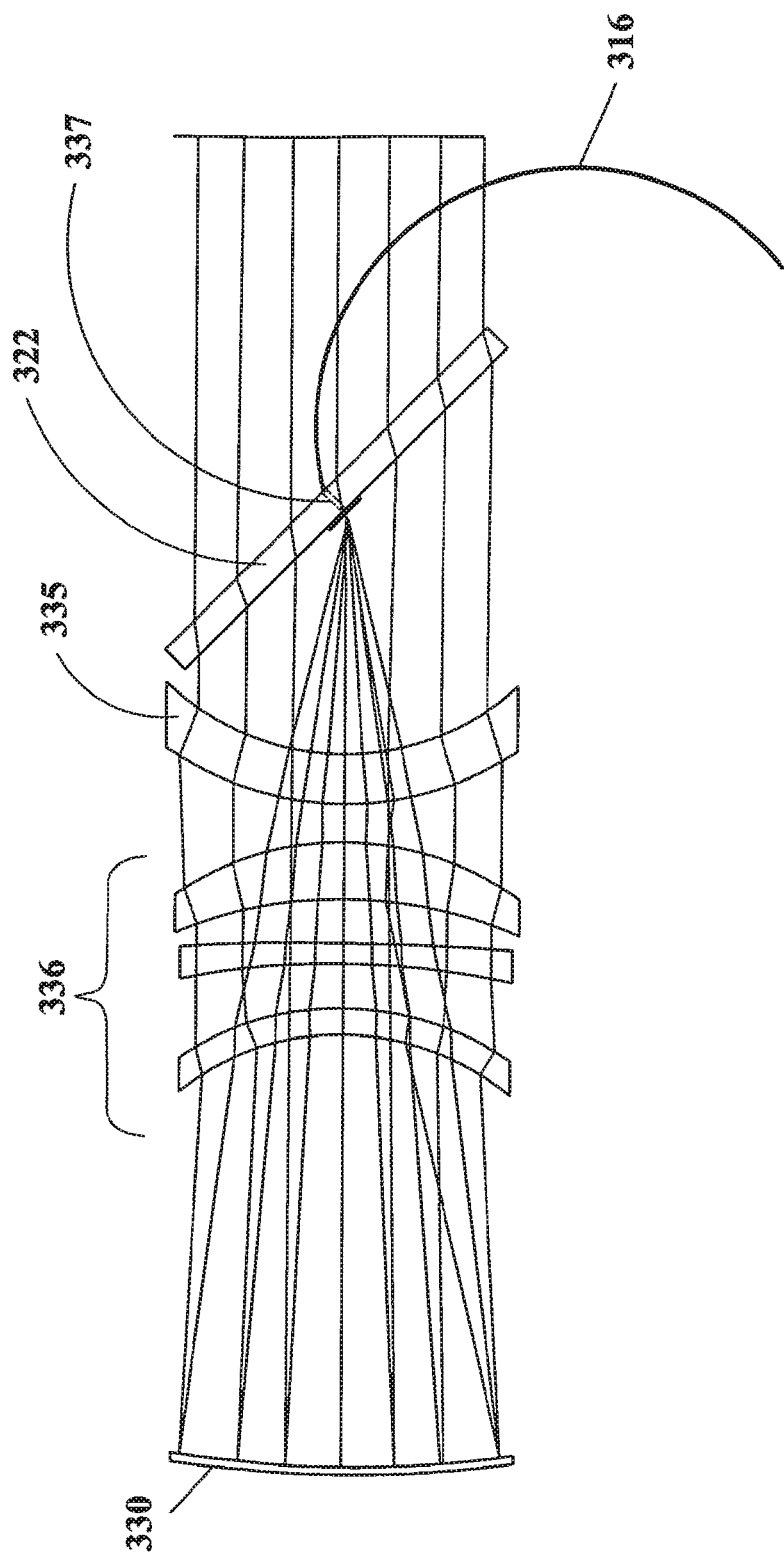
FIG. 15 shows the catadioptric portion of another example of an optical assembly according to the embodiment of FIGS. 14A, 14B, and 14C.
Figure 16B:
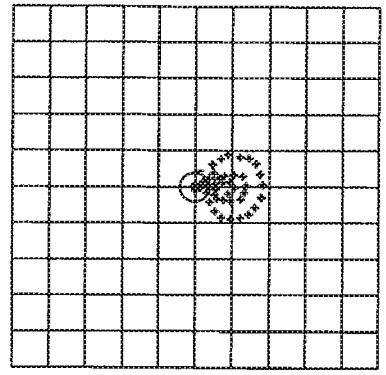
Figure 16C:
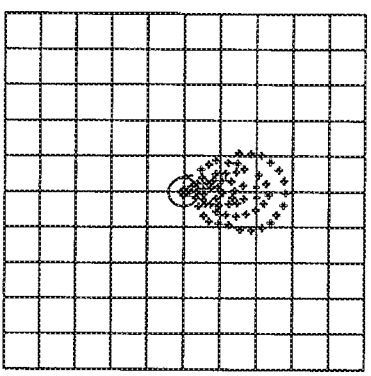
Figure 16A:
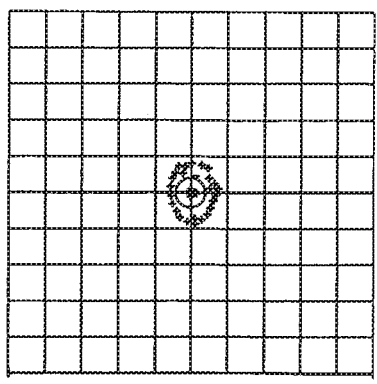
Figure 18A:
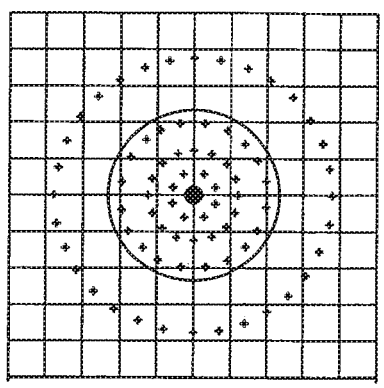
Figure 18B:
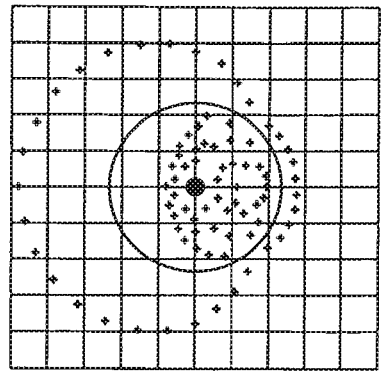
Figure 18C:
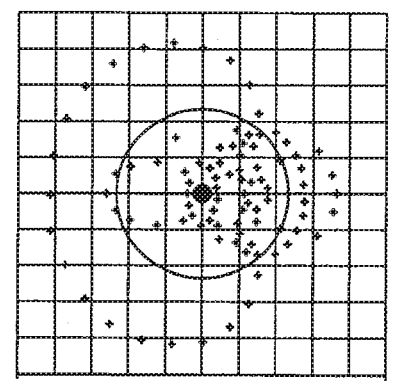
Figure 19A:
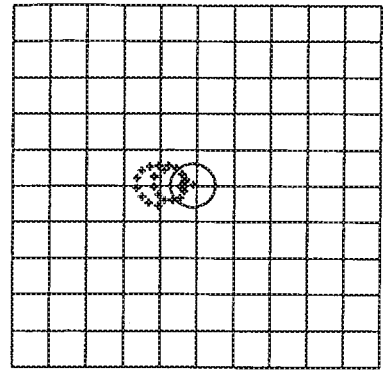
Figure 19C:
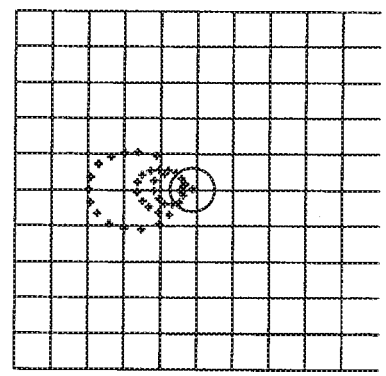
Figure 19B:
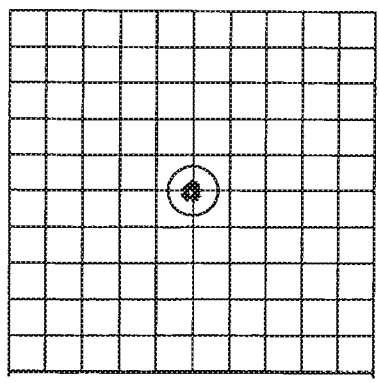

In yet another specific version of the first embodiment, the catadioptric portion of which is shown in FIG. 15, window 322 comprises what is known as a "cold mirror" because it transmits radiation the visible red and IR wavelength ranges of the pointing and measurement beams, and reflects radiation at shorter wavelengths. The optical fiber 316 is located at a hole 337 in a central location of the cold mirror 322, and the catadioptric optics receive the radiation of the pointing and measurement beams from the optical fiber 316 and reflect the radiation back through the cold mirror 322 and to the outlet 320 of the laser radar housing 312, in the manner described in connection with FIGS. 14A, 14B and 14C. That version of the first embodiment can also include the one bi concave or plano concave optic (e.g. as shown at 332 in FIG. 14A) to vary focus of the radiation that is reflected back through the cold mirror (and which has a concave surface 334 with a center of curvature that is far from the fiber conjugate, to reduce stray radiation reflected from the lens surfaces (ghost images) from being directed back through the fiber). Alternatively, that version of the first embodiment can include a plurality of moving optics (e.g. as shown at 336 in FIGS. 14B and 14C) that are configured such that the focus of the pointing beam and measurement beam that is reflected by the catadioptric optics and directed back through the cold mirror 322 is changed by moving the set 336 of optics, which are characterized by low optical power but a large amount of spherical aberration.

FIGS. 16A-16C, 17A-17C, 18A-18C, 19A-19C, and 20A-20C show an example of the performance of an optical assembly according to the first embodiment of the present embodiments. In the example of FIGS. 16A-16C, 17A-17C, 18A-18C, 19A-19C, and 20A-20C, performance is shown at 1, 2, 5, 24, and 60 meters (for the IR light), where the red light is well focused for all positions. FIGS. 16A-16C, 17A-17C, 18A-18C, 19A-19C, and 20A-20C (and exhibit A) show spot diagrams that indicate the level of performance of the optical system, which should be familiar to those in the art. The solid circles in FIGS. 16A-16C, 17A-17C, 18A-18C, 19A-19C, and 20A-20C (and exhibit A) indicate the diffraction limit as defined by the wavelength and aperture of the laser radar optical system. The diffraction limit represents the best possible performance for this optical system, as is well understood by those in the art. The three plots for each target distance of 1, 2, 5, 24 and 60 meters show the performance as the fiber moves off-axis relative to the catadioptric optical system 328 and/or relay system 324. The three plots for each target distance are for an off-axis distance of 0 mm for FIGS. 16A, 17A, 18A, 19A, and 20A, 0.3 mm for FIGS. 16B, 17B, 18B, 19B, and 20B, and 0.5 mm for FIGS. 16C, 17C, 18C, 19C, and 20C. The '+' marks indicate the focused locations of the different rays; if all of these marks are within or close to the circle defining the diffraction limit, then the performance of the lens is diffraction limited, as is well understood by those in the art.

An important aspect of the laser radar's ability to measure the position of the target in three dimensions is the ability to resolve the spot location in a plane perpendicular to the pointing (optical) axis of the laser radar. This is done by accurately measuring the two pointing angles for the steering assembly that points the entire optical assembly. However, in certain situations, the spatial resolution of the target location in the plane perpendicular to the pointing axis can be limited by the size of the spot imaged by the optical assembly at the target. In other words, the smaller the imaged spot of light at the target, the better the position of the target can be determined in three dimensions. So the performance illustrated in FIGS. 16A-16C, 17A-17C, 18A-18C, 19A-19C, and 20A-20C shows that the typical performance achieved using the type of system described in this document can be diffraction limited, as will be clear to those in the art.

In addition, the size of the imaged spot determines how much light can be collected by the optical assembly. If more light is focused onto the target, more light is reflected or scattered by the target and an appropriate fraction of that reflected or scattered light is collected by the optical assembly and focused back to the fiber 316, allowing an accurate measurement of the distance between the laser radar and the target. In other words, a smaller spot allows more measurement light to return to the optical assembly and a more accurate distance measurement to be made, using the techniques described by U.S. Pat. Nos. 4,733,609, 4,824,251, 4,830,486, 4,969,736, 5,114,226, 7,139,446, 7,925,134, and Japanese Patent #2,664,399, which are incorporated by reference herein.

Figure 21:
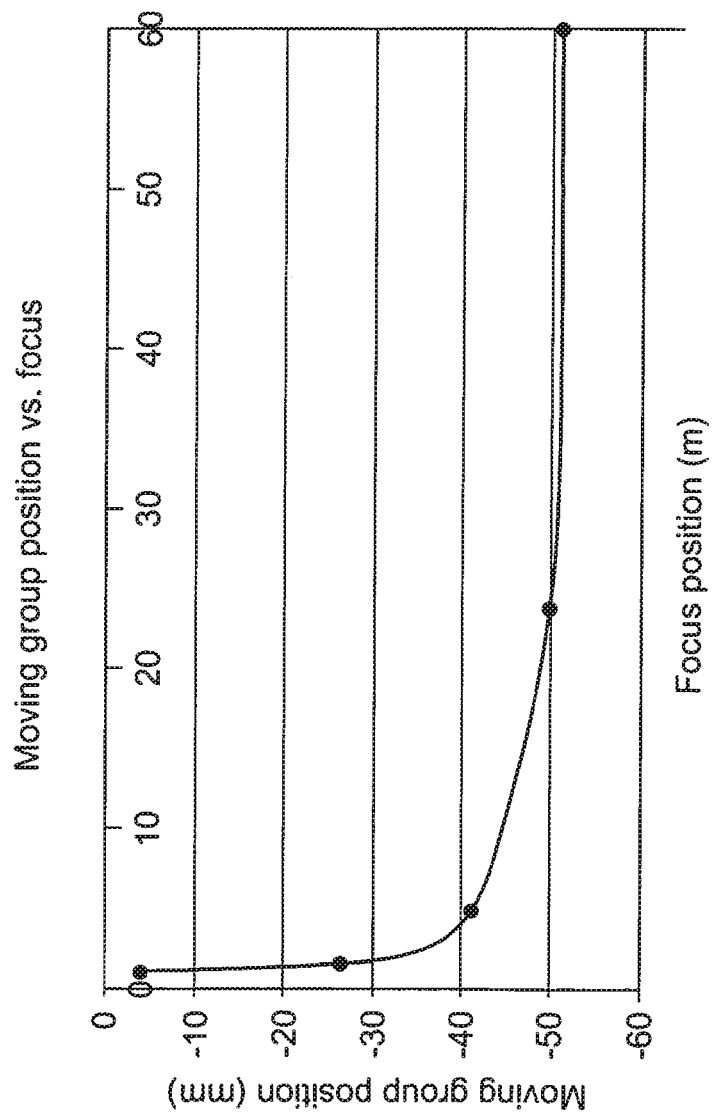
FIG. 21 illustrates additional performance capabilities of an optical assembly according to the embodiment of FIGS. 14A, 14B, and 14C.

FIG. 21 shows an example of the focus location of the measurement and pointing beams as a function of the axial position of the moving group 336, with an optical assembly according to the present embodiments. The plot shown in FIG. 21 shows the moving group position specifically for the configuration shown in FIGS. 14B and 14C, and demonstrates that to go from 1 meter to 60 meters in distance (from the laser radar housing 312 to the target) requires approximately 47 mm of movement of the moveable group of optics 336.

As will be appreciated by those in the art, the optical assembly 314 of the first embodiment is compact and rigid, and uses the concave mirror 330 for much of the optical power. Also, the concave mirror 330 produces no chromatic aberration. In the embodiments of FIGS. 14A-14C, the window 322 has the small silvered region 326 added to one side of the window (creating a small obscuration). The other side of the window 322, would have a wavelength selective coating that transmits light in the predetermined (e.g. visible red, IR) wavelength ranges, and reflects light in the visible part of the spectrum, except for the wavelength used for the visible pointing beam. This allows the camera 340 to use that remaining visible light to view the scene being measured by the laser radar system.

Also, it should be noted that the primary mirror 330 is concave, and in the preferred embodiment, it is spherical. The primary mirror 330 can help achromatize the optical assembly. Focusing can be accomplished by the bi concave or plano concave moving lens 332 in the embodiment of FIG. 14A. Focusing can also be accomplished by moving the lens group 136 (FIGS. 14B, 14C) between the primary mirror 330 and the cold mirror 322.

Thus, the catadioptric optical assembly of the first embodiment, provides a compact optical assembly, designed to (i) remove the need for a moving mirror (removing problematic doppler effects), (ii) get the two wavelengths (red and IR) in focus simultaneously. The moveable lens 332, or lens group 336, located between the concave mirror 330 and the window (or cold mirror) 322 achieve focusing, with the components described and shown herein.

Moreover, the optical assembly is designed to provide a continuous focus range from 1 meter to 60 meters, from the window (or cold mirror) 322. The obscuration on the back surface of the window (or cold mirror) is quite small, and the chromatic aberration introduced by the relay 324 is corrected by the catadioptric optics.

Thus, the first embodiment provides a compact optical assembly that is useful in a laser radar system because it eliminates the need for a large scanning (pointing) mirror that is moveable relative to other parts of the laser radar system. In addition, the compact optical assembly of the first embodiment has a catadioptric configuration with a concave mirror that provides most of the optical power, and allows easier achromatization between the two required wavelengths of the pointing and measurement beams. The concave mirror folds the optical path onto itself, reducing the overall size substantially. The size of the system should be small enough to allow the camera 340 (FIGS. 13, 14A) to be located on the moving part of the laser radar system, eliminating parallax effects by use of a reflective window or cold mirror that allows the camera optical axis to be collinear with the axis of the measurement beam. Since the window (or cold mirror) 322 is the last optical element before the light is projected to the target, this new optical assembly allows a wide field-of-view camera 340 to be used that can point in the same direction and along the same axis as the laser radar by configuring the camera's view to be reflected off of the window (or cold mirror) 322. The obscuration is small and won't cause significant increases in the size of the spot produced at the target during laser radar operation.

Accordingly, as seen from the foregoing description, the present embodiments provides a compact optical assembly for a laser radar system, comprising catadioptric optics that moves as a unit with the laser radar system and transmits pointing and measurement beams to the outlet of the laser radar system, while eliminating the need for a scanning (pointing) mirror that is moveable relative to other components of the laser radar system. With the foregoing description in mind, the manner in which the optical assembly of the present embodiments can be implemented in various types of laser radar systems will be apparent to those in the art.

Second Embodiment

The second embodiment of the present invention would have a laser radar system 400 that is configured and operates in accordance with the general principles described above in connection with FIGS. 12 and 13. Certain basic features of an optical assembly 414 according to a second embodiment of the present embodiments can be appreciated from FIGS. 22A and 22B. The optical assembly of FIG. 22A comprises a light source represented by a fiber 430 through which a pointing beam and a measurement beam are directed, a lens 432, a scanning reflector 434 and a fixed reflector that in FIG. 22A comprises a plane mirror 436. Those components co-operate to direct and focus the pointing and measurement beams from the fiber 430 along a line of sight 438 that preferably coincides with the optical axis of the optical assembly and extends through the lens 432. The fiber 430, the lens 432, the scanning reflector 434 and the plane mirror are oriented relative to each other such that the pointing and measurement beams from the fiber 430 are reflected by the scanning reflector 434 to the plane mirror 436, and reflected pointing and measurement beams from the plane mirror 436 are reflected again by the scanning reflector 434 and directed along the line of sight 438 through the lens 432. The pointing and measurement beams are then directed from the laser radar system and at the target 406.

In the embodiment of FIG. 22A, the scanning reflector 434 comprises a retroreflector that is preferably a corner cube that translates (e.g. in the z direction) relative to the fiber 430, the lens 432 and the plane mirror 436 which are all fixed to the support structure of the optical assembly. Movement (or translation) of the corner cube 434 adjusts the focus of the pointing and measurement beams along the line of sight 438 by the changing the distance the measurement beam travels between the fiber and the lens. The corner cube 434 has at least three reflective surfaces that are oriented so that (i) the pointing and measurement beams from the source are reflected through the corner cube 434 to the plane mirror 436, (ii) the pointing and measurement beams reflected from the plane mirror 436 are again reflected through the corner cube 434, and (iii) movement of the corner cube in at least one predetermined direction (e.g. the z direction in FIG. 22A) adjusts the focus of the pointing and measurement beams along the line of sight 438, in a manner that is substantially unaffected by movement of the corner cube in directions transverse to the predetermined direction or by rotations of the corner cube relative to the predetermined direction. FIG. 22B is a fragmentary, schematic illustration of the optical assembly of FIG. 22A, showing the reflection schema provided by the corner cube 434 and the plane mirror 436, that makes the reflection of the pointing and measurement beams unaffected by movement of the corner cube 434 in directions transverse to the z direction or by rotation of the corner cube relative to the z direction.

The fiber 432 is associated with a fiber beam combiner that combines a pointing beam in the visible (e.g. red) wavelength range with the measurement beam in the different, e.g. infrared (IR) wavelength range. The pointing beam and measurement beams are generated from separate sources, and are combined by the fiber beam combiner (that is located inside the base 410) in a manner well known to those in the art. The combined pointing and measurement beams are directed from the fiber 430 and focused along the line of sight 438 in the manner described herein.

Thus, with the version of the second embodiment shown in FIGS. 22A and 22B, the pointing and measurement beams are directed along the line of sight 438, and the focus of the pointing and measurement beams along the line of sight is adjusted by translation of a single element (i.e. the corner cube 434) and in a way that is insensitive to (i.e. unaffected by) movement of the corner cube in directions transverse to the z direction or by rotation of the corner cube relative to the z direction. Also, the optical assembly of FIGS. 22A and 22B is extremely compact, and made up of relatively few elements. For a given configuration, the corner cube 434 can adjust the focus of the pointing and measurement beams by translation over a distance of not more than about 22 mm relative to the fixed components (fiber, plane mirror and lens), which contributes to the compactness of the optical assembly.

With the version of the second embodiment of FIGS. 22A and 22B, the pointing and measurement beams are directed along the line of sight and to the outlet 420 of the laser radar system. The pointing and measurement beams direct the measurement beam from the lasar radar system and to a spot on the target 406, where the radiation is reflected and/or scattered by the target. In accordance with the principles of a laser radar system, the optical assembly 414 will receive at least some radiation that is reflected or scattered from the target 406, and that radiation will be directed back through the fiber 430, in a manner that will be apparent to those in the art.

The size of the imaged spot of the measurement beam on the target 406 determines how much light can be collected by the optical assembly. If more light is focused onto the target, more light is reflected or scattered by the target and an appropriate fraction of that reflected or scattered light is collected by the optical assembly and focused back to the fiber 430, allowing an accurate measurement of the distance between the laser radar and the target. In other words, a smaller spot allows more measurement light to return to the optical assembly and a more accurate distance measurement to be made, using the techniques described by U.S. Pat. Nos. 4,733,609, 4,824,251, 4,830,486, 4,969,736, 5,114,226, 7,139,446, 7,925,134, and Japanese Patent #2,664,399, which are incorporated by reference herein.

In the optical assembly of the version of the second embodiment shown in FIGS. 22A and 22B, the provision of the plane mirror 436 which is fixed in relation to the corner cube 434 sends the first pass beam that leaves the corner cube back through the corner cube, while the system remains insensitive to tip/tilt of the translating corner cube relative to the z direction. The lateral translation of the corner cube 434 in the z direction still causes a shift on the first pass, but the plane mirror 436 reverses the beam back through the corner cube, where it picks up an equal and opposite shift, cancelling it out. On each pass through the corner cube, the retroreflective properties of the corner cube insure that the output beam is parallel to the input beam, regardless of the orientation of the corner cube, i.e. tip, tilt or roll. Thus, the system in FIG. 22A is therefore nominally insensitive to tip/tilt and x/y motions of the corner cube. FIG. 22B shows how the fixed plane mirror 436 makes the system insensitive to x/y motions of the corner cube.

In addition, since the laser radar system uses two wavelengths, and the system is sensitive to backreflections, the corner cube 434 could also be a set of three mirrors (an air-corner cube), rather than a solid glass traditional corner cube. Then, each beam is incident on a first surface mirror. Therefore, there are no surfaces that can create a ghost image that can contribute the noise floor for the distance measuring component of the laser radar, other than the 2" lens for providing the optical power.

Since the corner cube 434 is traversed by the beam twice and is reflected, the optical path between the fiber 430, and the lens 432 is four times the motion of the corner cube; a 1 mm motion of the corner cube changes the distance between the fiber and lens by 4 mm. Based on the known NA of the fiber of about 0.1, it can be seen that the ideal focal length for the fixed lens 432 is about 250 mm, based on an output aperture of 50 mm. Based on the Newtonian equations for object/image relationships, the total focus range required is about 88 mm between the near (1 meter) and far (60 meter) focus positions. This translates to a corner cube translation of 88/4=~22 mm. Therefore, the only lens required is the 2" diameter objective lens 432.

The other big advantage of this optical assembly is that because the optical path 438 is folded through the corner cube 434 twice, the 250 mm to (88+250)=338 mm is fit into a very compact volume. The long focal length means the aberration requirements on the lens 432 are also relaxed relative to a shorter, unfolded system.

A major difference between this system and the systems where a transmissive optic(s) is (are) translated is that since the fiber is the z position reference, motion of the focusing element (the corner cube 434) changes the z position between the fiber 430 and the last lens element. Therefore, the system must know the position of the corner cube accurately enough to make a simple correction for this motion. A current system parameter has an axial position measurement accuracy of 5 μm+1.25 ppm/meter, or a minimum of 6.25 μm at 1 meter focus. This means the stage position must be measured to 6.25/4=1.56 μm, worst case. At far focus (60 m), the stage must only be known to 80/4=20 μm. Given all the advantages of this system, this seems to be a small tradeoff.

With the system of FIG. 22A, the input fiber 430 is right in the middle of the diverging output beam. If the system was built like FIG. 22A, the structure for holding the fiber 430 would block light, and some of the light would be incident directly back on the fiber, potentially introducing a noise floor. The alternative system shown in FIGS. 23A, 23B, and 23C provides a way of addressing this issue.

The optical assembly 414a that is shown in FIGS. 23A, 23B, and 23C provides a second version of the second embodiment, and includes a fiber 430a that provides a source of the pointing and measurement beams, a lens 432a, a scanning reflector 434a and a fixed reflector 436a. The scanning reflector 434a comprises a reflective roof that provides two reflections of the pointing and measurement beams, and the fixed reflector 436a comprises a reflective roof that also provides two reflections of the pointing and measurement beams. Also, the nodal lines 440, 442 of the reflective roofs 434a and 436a, respectively, are in a predetermined orientation relative to each other.

The version of the present invention shown in FIGS. 23A, 23B, and 23C, functions in a manner that is generally similar to that of the version of FIGS. 22A and 22B. The reflective roof 434a has a pair of reflective surfaces that are oriented so that (i) the pointing and measurement beams from the source are reflected through the reflective roof 434a to the fixed reflective roof 436a, and the pointing and measurement beams reflected from the fixed reflective roof 436a are again reflected through the reflective roof 434a, and (ii) movement of the reflective roof 434a in at least one predetermined direction (e.g. the z direction in FIG. 23A) adjusts the focus of the pointing and measurement beams along the line of sight 438a FIG. 23C is a fragmentary, schematic illustration of the optical assembly of FIGS. 23A and 23B, showing the reflection schema provided by the reflective roof 434a and the fixed reflective roof 436a. Thus, the pointing and measurement beams are directed along the line of sight 438a, and the focus of the pointing and measurement beams along the line of sight is adjusted by translation of a single element (the reflective roof 434a) in the z direction relative to the fixed reflective roof 436a, the lens 432a, and the fiber 430a. The optical assembly of FIGS. 23A, 23B, and 23C is extremely compact, and made up of relatively few elements. As with the previous version, the reflective roof 434a can adjust the focus of the pointing and measurement beams by translation over a distance of not more than 22 mm relative to the fixed components (fiber 430a, fixed reflective roof 436a and lens 432a), which contributes to the compactness of the optical assembly 414a.

The optical assembly of FIGS. 23A, 23B, and 23C addresses the issue of the input fiber being right in the middle of the diverging output beam, so that the structure for holding the fiber would block light, and some of the light would be incident directly back on the fiber, causing a large noise floor. Specifically, instead of translating a corner cube and using a fixed mirror, the optical assembly is broken into the two reflective roofs 434a, 436a. The reflective roof 434a translates in place of the corner cube, and reflective roof 436a is fixed and rotated 90° about the optical axis relative to the translating reflective roof 434a. This optical assembly achieves the same advantages as the system in FIG. 22A with one major additional advantage and one disadvantage. The pointing and measurement beams from the input fiber 430 go to the moving reflective roof 434a, and are translated down by reflective roof 434a. The pointing and measurement beams then go to the fixed reflective roof 436a, which shifts those beams into the page. Then the beams go back through reflective roof 434a and come out expanded but parallel to the input fiber 430a. However, thanks to the fixed roof 436a, the beams are translated relative to the fiber 430 in the −y direction of FIGS. 23A and 23B. Therefore, there is no obscuration or backreflection issue. The disadvantage, however, is that if the translating roof rotates about the z-axis, these ideal characteristics no longer hold exactly true.

If reflective roof 434a rotates about y while translating, it acts like a roof and doesn't change the angle. If it rotates about x, then reflective roof 434a acts like a plane mirror but fixed reflective roof 436a removes this angle change because fixed reflective roof 436a is rotated about the z-axis by 90 degrees. If reflective roof 434a shifts in x, it does shift the beam, but then fixed reflective roof 436a acts like a mirror (as in the system of FIG. 22A) and the second pass through reflective roof 434a corrects the shift. Finally, if reflective roof 434a shifts in y, it is like a plane mirror, so there is no change for the beam.

A series of first surface mirrors (in the form of two roof prisms forming the reflective roofs 434a, 436a) is used to change the axial distance between the fiber 430a and the fixed lens 432a. This system is nominally insensitive to tip/tilt and x/y shift of the moving element (the reflective roof 434a). The output beam from the two roof system is shifted relative to the input fiber 330a, so there is no obscuration or back reflection issue. In addition, since all the surfaces are first surface mirrors, there are no interfaces that can create ghost reflections. The folded nature of the beam path makes it very compact, allowing for stable mechanics. The long focal length of the system means the fixed reflective roof 436a can likely be an off-the-shelf color corrected doublet.

FIGS. 24-28 schematically illustrate various concepts for configuring and orienting the components of the optical assembly of the second embodiment.

Figure 24:
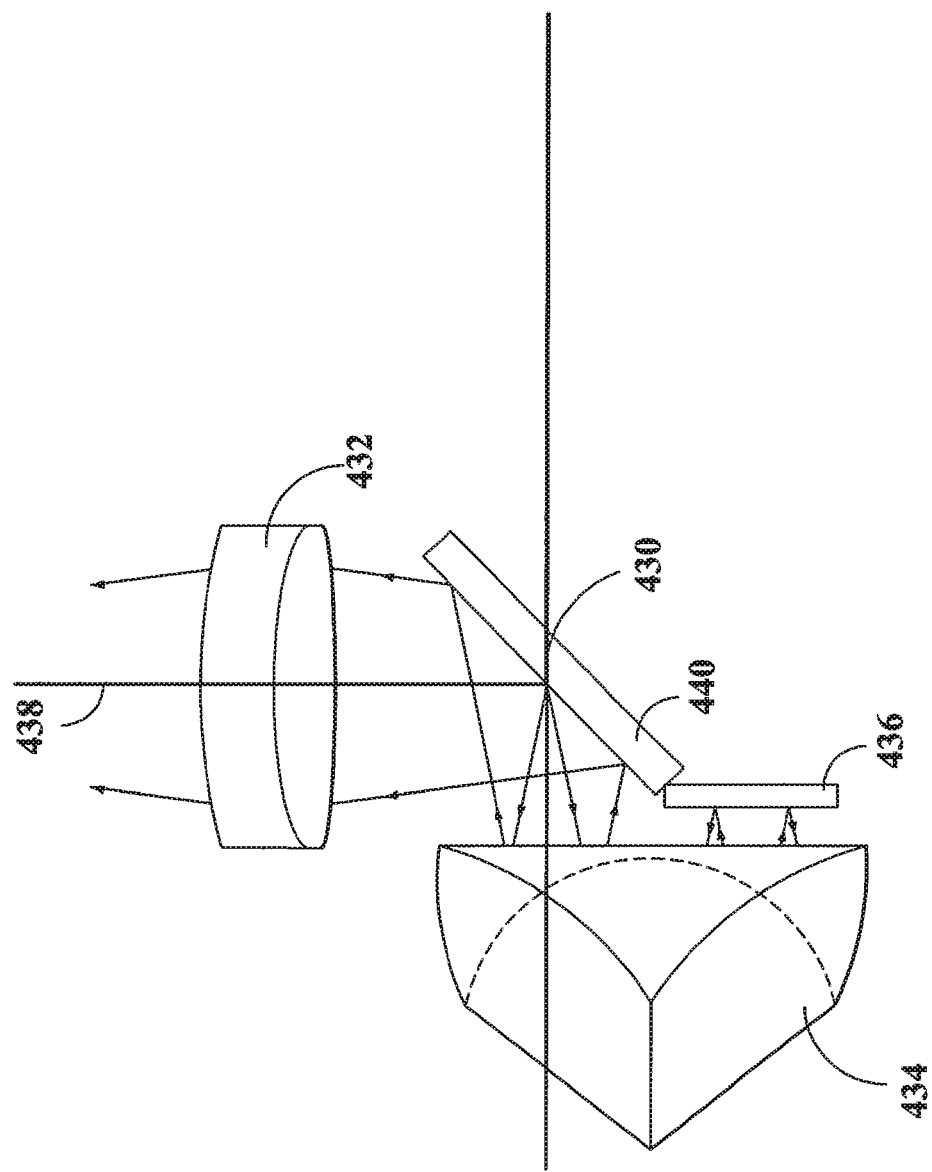
FIGS. 24-28 are schematic illustration of additional concepts of an optical assembly according to another embodiment.

For example, as shown in FIG. 24, the pointing and measurement beams reflected by the scanning reflector 434 and directed along the line of sight 438 through the lens, are reflected by a fold mirror 444 that folds the line of sight 438 of the pointing and measurement beams directed through the lens 432. As further shown in FIG. 24, the fiber 430 can be located in the fold mirror 444.

The optical assembly of the present invention is designed to be focused at a range of a meter to 60 meters from the lens 432. When the system shown in FIG. 24 is focused at 1 meter from the lens, less light is directed to the target, but the light loss is only a few percent. When the optical assembly is focused at 60 meters, by movement of the corner cube 434 about 22 mm, the beam pretty much fills the aperture of the lens 432, so substantially all the light is used to make the spot that impinges on the target.

Figure 25:
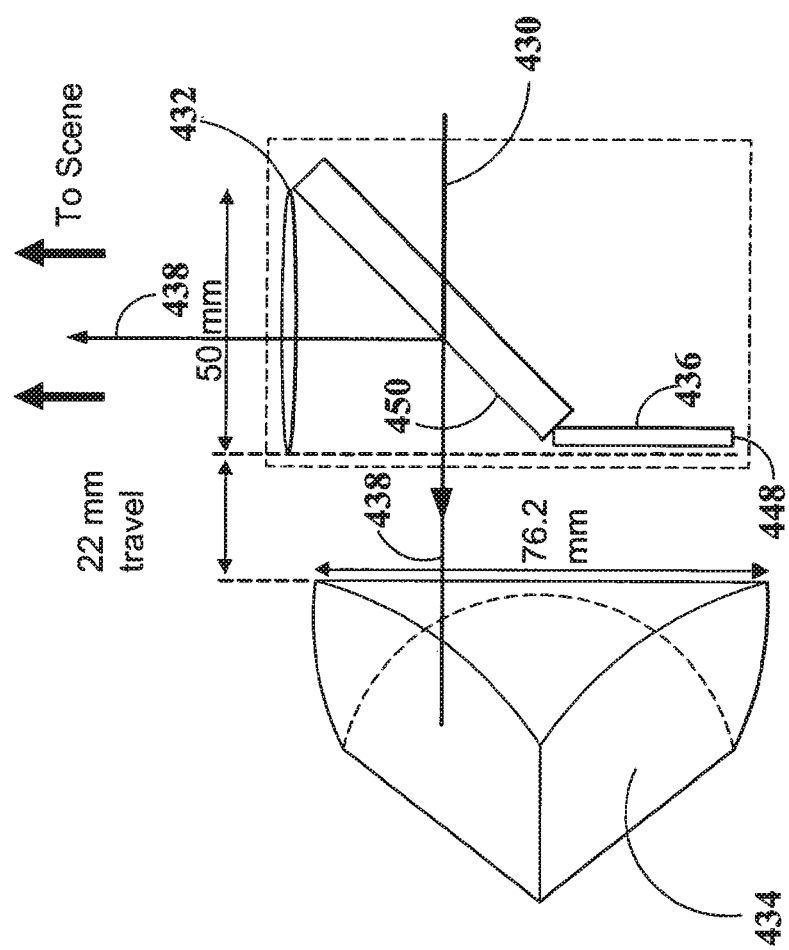

In addition, as schematically shown in FIG. 25, the lens 432, the beam source (i.e. fiber 430) and the plane mirror 436 are supported in a manner such that they can move as a unit relative to the retroreflector 434, and wherein the line of sight moves with the unit. Thus, as illustrated by FIG. 25, the lens 432, the plane mirror and the fiber 430 are supported by a box 446, so that all of those components can move as a unit relative to the retroreflector 434. Therefore, reference to the retroreflector and the other components (fiber, lens, fixed reflector) being moveable "relative" to each other can mean that the other components are fixed by a support structure, and the retroreflector moves relative to the support structure, or the support structure for the other components (e.g. the box 346 in FIG. 21) enables those other components to move (e.g. rotate) as a unit relative to the retroreflector 434.

Moreover, as also shown in FIG. 25, the pointing and measurement beams reflected by the scanning reflector 434 and directed along the line of sight through the lens 432 are reflected by a polarization beam splitter plate 450 that folds the line of sight 438 of the pointing and measurement beams directed through the lens (in a manner similar to that shown in FIG. 24). In FIG. 25, the polarization beam splitter plate 450 has a polarization beam splitting coating that enables the polarization beam splitter plate 450 to function as a polarization beam splitter, and a quarter wave plate 448 is provided on the plane mirror 436, to adjust the polarization of the beams reflected from the plane mirror 436. In FIG. 21, the optical fiber 430 that is the beam source is represented by a dot in a predetermined location relative to the polarization beam splitter plate 450.

Thus, in the concept shown in FIG. 25, the polarization beamsplitter plate (PBS) 450 is used to prevent the light being directed along the line of sight from coupling back into the fiber 430. Since the measurement beam is linearly polarized, its polarization state can be rotated 90 degrees by going through the quarter wave plate (QWP) 448 oriented at 45 degrees twice. In this case, the QWP 448 also has the second surface mirror 436 that acts as the mirror 436 of the system in the manner shown and described in connection with FIG. 22A. The fiber 430 is placed near the back surface of the PBS plate 450. Since it is a PBS plate and the input surface is tilted at 45 degrees relative to the fiber, any reflection off the back surface will not go back to the fiber. The corner cube 434 is solid glass, since this is an off-the-shelf part and since this increases the axial distance (physical distance) between the fiber and the lens. There is no obscuration in this optical assembly.

Also, in the concept shown in FIG. 25, the corner cube 434 can be held fixed and the plane mirror, fold mirror, lens and fiber (all of which are supported in the box 446) all rotate about the centerline of the corner cube. The rotation must be about the centerline of the corner cube or else the beams will move outside the edges of the corner cube during rotation. This concept of the second embodiment, can reduce the rotating mass that needs to be moved about an elevation axis, which would allow a smaller, lighter elevation axis motor to be used and would also result in less heat generation (the heat source being the actuator used to move the components). Also, it may result in an even more compact assembly. It can also lead to a reduction in focus stage complexity, and result in fewer cables that need to pass through a rotating joint so cable routing is simpler and cable disturbances caused by moving cables can be reduced to improve motion accuracy and thus instrument performance. Thus, this aspect of the concept of FIG. 25 can produce a smaller, simpler and more cost effective optical assembly, and reduction of cable disturbances should also improve accuracy.

Figure 26:
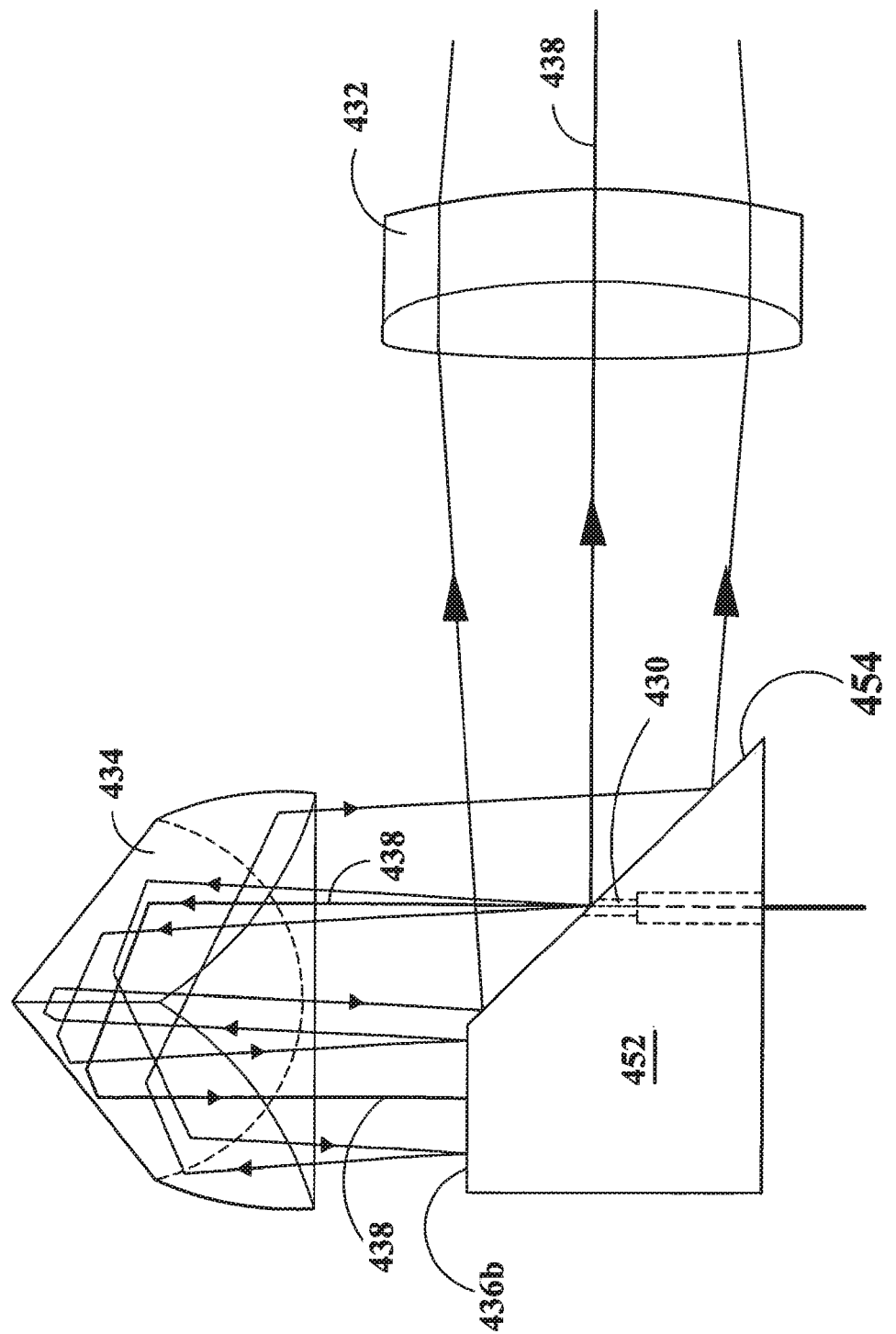

Still further, as shown schematically in FIG. 26, the source comprises an optical fiber 430 supported by a monolithic member 452 that has a portion 436b that functions as the plane mirror and another portion 454 that folds the line of sight 438 of the pointing and measurement beams reflected by the scanning reflector 434 and directed along the line of sight through the lens 432.

Figure 27:
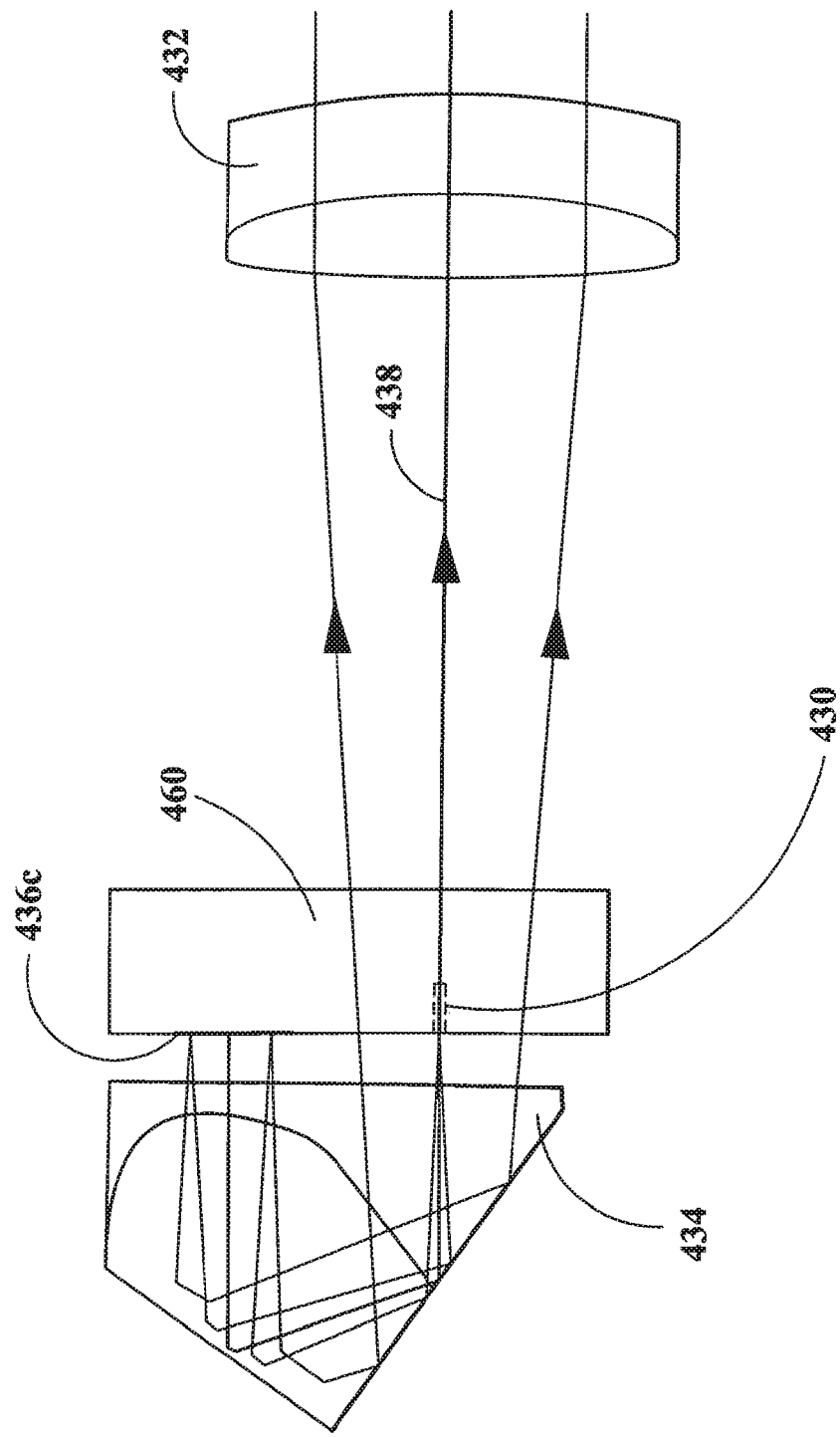

Also, as shown schematically in FIG. 27, the source can comprise an optical fiber 430 supported by a transmissive member (e.g. a glass window 460) that has a reflective portion 436c thereon that forms the plane mirror. In addition, the optical fiber can be supported by a mechanical structure 462 that applicants refer to as a "spider", shown in FIG. 28, that includes a series of struts 464 with a central opening 466 that forms the support for the optical fiber. The spider 462 can be made of a lightweight metal such as aluminum. Thus, the optical assembly can comprise the glass plate 460 with a hole for the fiber and a silvered area as the mirror 436c (as shown in FIG. 27) or a metal plate with the spider (FIG. 28) to hold the fiber and let light through and a separate mirror surface machined and polished that is attached to the spider, and forms the reflective portion 436c. Therefore, FIGS. 27 and 28 are similar, except that in FIG. 27 the transmissive member 460 that supports the fiber is a piece of glass, and in FIG. 28 the transmissive member is the air space(s) between the mechanical components of the spider 462.

Figure 28:
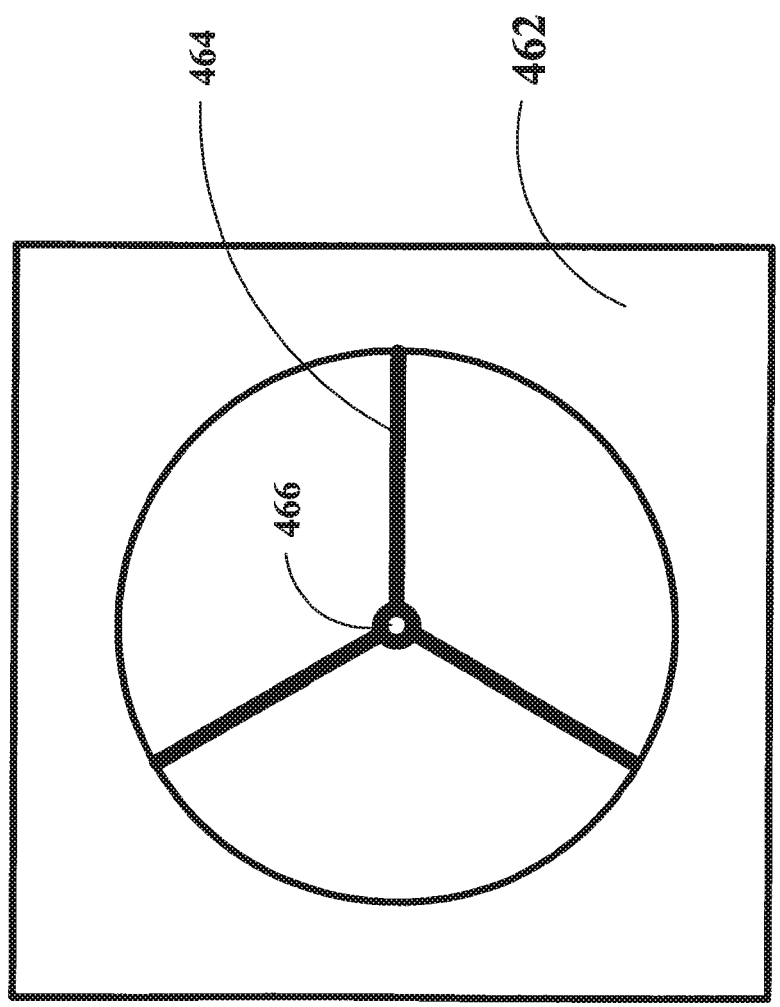

The concepts shown in FIGS. 26, 27, and 28 provide additional advantageous features to an optical assembly according to the second embodiment of the present invention. For example, the concept of FIG. 26 uses a single substrate for both mirrors and for holding the fiber. This may provide simpler fabrication, and may allow the single substrate to be formed of relatively light weight aluminum. With respect to the concepts of FIGS. 27 and 28, replacing a fold mirror with the window or window/spider arrangement, can reduce the overall weight of the optical assembly, because it eliminates the weight of a fold mirror. Also, the concepts of FIGS. 27 and 28 can reduce the requirement for additional tolerances on surface figure and mirror angle position. The result is that the corner cube now moves parallel to the optical axis of the lens rather than perpendicular to it. Thus, the optical assembly is simplified because it has one less mirror, so the angle between the mirrors is one less specification to meet. Moreover, the angle between the fiber hole and the mirror surface is more directly controllable when cutting normal to the surface (not really a problem if we use the monolithic metal mirror concept of FIG. 26). Also, the position of the fiber axis relative to the lens can be maintained more easily during fabrication (e.g. by holding both elements in a tube), thereby reducing the out-of-focus (repeatable) boresight error that occurs because the beam is not centered in the aperture. Still further because the fiber hole is parallel to the optical axis of the lens, it should also be easier to align the two, and strongly reduce thermal boresight error. Additionally, the corner cube can be closer to the fiber, so it can be smaller.

Accordingly, as seen from the foregoing description, the second embodiment of the present invention provides a compact optical assembly for a laser radar system, comprising a light source, a lens, a scanning reflector and a fixed reflector that co-operate to focus a beam from the light source along a line of sight that extends through the lens, where the light source, the lens, the scanning reflector and the fixed reflector are oriented relative to each other such that (i) a beam from the light source is reflected by the scanning reflector to the fixed reflector, (ii) reflected light from the fixed reflector is reflected again by the scanning reflector and directed along the line of sight through the lens, and (iii) the scanning reflector is moveable relative to the source, the lens and the fixed reflector, to adjust the focus of the beam along the line of sight.

In this embodiment, the laser radar system 400 has the pointing beam and measurement beam. However the laser radar system 400 may have the measurement beam without the pointing beam. For example, the measurement beam is in the visible. Therefore, in this case, the measurement beam can also play pointing beam. The laser radar system 400 of this embodiment has the different wavelength region between the pointing beam and measurement beam. However the laser radar system 400 may have the same wavelength region such as the visible region.

In an optional embodiment, the optical assembly has a lens 432, a scanning reflector 434 and a fixed reflector. However the optical assembly may have a lens 432, a scanning reflector 434 without a fixed reflector. For example, the measurement beam can be directly directed from reflector 434 to lens 432.

As for the laser radar system 400, the second embodiment is also applicable to the distance measurement system that determine six degrees of freedom ($\alpha$, $\beta$, d, $\varphi$, $\chi$, $\psi$) of a reflector or of an object on which the reflector is arranged, comprises an angle- and distance measurement apparatus, e.g. a laser tracker as disclosed in US published application US2006-0222314 (which is incorporated by reference herein). As for the laser radar system 400, the present invention is also applicable to the distance measurement system that determine an distance between the measurement system and the target point and/or a change of this distance by comparison of the emitted and reflected laser light, e.g. a laser tracker as disclosed in US published application US 2011-0181872 (which is also incorporated by reference herein).

According to one embodiment, an apparatus for inspecting or measuring an object comprises an optical assembly moveable as a unit as part of the apparatus, and configured to direct a measurement beam through an outlet of the optical assembly. The optical assembly is configured to fold the optical path of the measurement beam that is being directed through the outlet of the optical assembly.

In some embodiments, the optical assembly includes catadioptric optics.

In some embodiments, the travel direction of light optics changes in the optical assembly.

In some embodiments, the apparatus further comprises a first splitter configured to separate between the measurement beam and a reference beam.

In some embodiments, the apparatus further comprises a second splitter configured to mix between a reflected measurement beam from the object and the reference beam, to measure the distance of the object.

In some embodiments, the apparatus further comprises a moveable portion configured to move the optical assembly along two axes that have different directions.

In some embodiments, the optical assembly includes a window with a transmissive portion through which the measurement beam is directed to the outlet of the optical assembly.

In some embodiments, the optical assembly includes a relay system that directs the measurement beam from an optical fiber to a reflective area of the window, and the catadioptric optics receive and reflect the measurement beam from the reflective area of the window back through a transmissive portion of the window, to fold the optical path of the pointing beam and measurement beam that is being directed through the outlet of the optical assembly.

In some embodiments, the optical assembly includes at least one moveable optic to vary focus of the measurement beam that is reflected by the catadioptric optics and directed back through the transmissive portion of the window.

In some embodiments, the focus of the measurement beam that is reflected by the catadioptric optics and directed back through the transmissive portion of the window is changed by moving a plurality of optics, the plurality of optics characterized by low optical power but a large amount of spherical aberration.

In some embodiments, the window comprises a cold mirror that transmits light in a predetermined wavelength range that includes the wavelength range of the pointing beam and the measurement beam, and wherein an optical fiber that transmits the pointing beam and the measurement beams is located at a central location of the cold mirror, and the catadioptric optics receive the measurement beam from the optical fiber and reflect the measurement beam back through the cold mirror, where it is directed to the outlet of the optical assembly.

In some embodiments, the optical assembly includes at least one moveable optic to vary focus of the measurement beam that is reflected by the catadioptric optics and directed back through the cold mirror.

In some embodiments, the focus of the measurement beam that is reflected by the catadioptric optics and directed back through the transmissive portion of the window is changed by moving a plurality of optics, the plurality of optics characterized by low optical power but a large amount of spherical aberration.

In some embodiments, the measurement beam is combined with a pointing beam.

In some embodiments, the optical assembly is configured to direct the measurement beam along a line of sight and through the outlet of the optical assembly, the optical assembly including a scanning reflector, the scanning reflector is moveable to adjust the focus of the measurement beam along the line of sight.

In some embodiments, the optical assembly comprises a fixed reflector, where the fixed reflector and scanning reflector are oriented relative to each other such that the measurement beam from a light source is reflected by the scanning reflector to the fixed reflector, and reflected measurement beam from the fixed reflector is reflected again by the scanning reflector and wherein the scanning reflector is moveable relative to the fixed reflector, to adjust the focus of the measurement beam along the line of sight.

In some embodiments, the scanning reflector comprises a retroreflector, and the fixed reflector comprises a plane mirror.

In some embodiments, the source, the lens and the plane mirror are all in fixed locations relative to the support structure for the optical assembly, and the retroreflector is moveable relative to those fixed locations, to vary the focus of the measurement beam along the line of sight.

In some embodiments, the retroreflector comprises a corner cube that has at least three reflective surfaces that are oriented so that (i) the measurement beam from the source is reflected through the corner cube to the plane mirror, and the measurement beam reflected from the plane mirror is again reflected through the corner cube, and (ii) movement of the corner cube in at least one predetermined direction adjusts the focus of the measurement beams along the line of sight, in a manner that is substantially unaffected by movement of the corner cube in directions transverse to the predetermined direction or by rotations of the corner cube relative to the predetermined direction.

In some embodiments, the scanning reflector comprises a reflective roof that provides two reflections of the measurement beam, and the fixed reflector comprises a reflective roof that also provides two reflections of the measurement beam, where the nodal lines of both reflective roofs are in a predetermined orientation relative to each other.

In some embodiments, the measurement beam reflected by the scanning reflector and directed along the line of sight, are reflected by a fold mirror that folds the line of sight of the measurement beam.

In some embodiments, the beam source and the plane mirror are supported in a manner such that they can move as a unit relative to the retroreflector, and wherein the line of sight moves with the unit.

In some embodiments, the source comprises an optical fiber supported by the fold mirror.

In some embodiments, the measurement beams reflected by the scanning reflector and directed along the line of sight are reflected by a polarization beam splitter that folds the line of sight of the measurement beam, and wherein the source comprises an optical fiber in a predetermined location relative to the polarization beam splitter that folds the line of sight of the measurement beams.

In some embodiments, the source comprises an optical fiber supported by a monolithic member that has a portion that functions as the plane minor and another portion that folds the line of sight of the measurement beams reflected by the scanning reflector.

In some embodiments, the source comprises an optical fiber supported by a transmissive member that also supports the plane mirror.

In another representative embodiment, an optical assembly for focusing a beam along a line of sight comprises a lens, a scanning reflector and a fixed reflector that co-operate to focus a beam from a light source along a line of sight that extends through the lens, where the lens, the scanning reflector and the fixed reflector are oriented relative to each other such that a beam from the light source is reflected by the scanning reflector to the fixed reflector, and reflected light from the fixed reflector is reflected again by the scanning reflector and directed along the line of sight through the lens, and wherein the scanning reflector is moveable relative to the source, the lens and the fixed reflector, to adjust the focus of the beam along the line of sight.

In some embodiments, the scanning reflector comprises a retroreflector, and the fixed reflector comprises a plane mirror.

In some embodiments, the source, the lens and the plane mirror are all in fixed locations relative to the support structure for the optical assembly, and the retroreflector is moveable relative to those fixed locations, to vary the focus of the beam along the line of sight.

In some embodiments, the retroreflector comprises a corner cube that has at least three reflective surfaces that are oriented so that (i) light from the source is reflected through the corner cube to the plane mirror, and light reflected from the plane mirror is again reflected through the corner cube, and (ii) movement of the corner cube in at least one predetermined direction adjusts the focus of the beam along the line of sight, in a manner that is substantially unaffected by movement of the corner cube in directions transverse to the predetermined direction or by rotations of the corner cube relative to the predetermined direction.

In some embodiments, the scanning reflector comprises a reflective roof that provides two reflections of the beam, and the fixed reflector comprises a reflective roof that also provides two reflections of the beam, where the nodal lines of both reflective roofs are in a predetermined orientation relative to each other.

In some embodiments, the beam reflected by the scanning reflector and directed along the line of sight through the lens, is reflected by a fold mirror that folds the line of sight of the beam directed through the lens.

In some embodiments, the lens, the beam source and the plane mirror are supported in a manner such that they can move as a unit relative to the retroreflector, and wherein the line of sight moves with the unit.

In some embodiments, the source comprises an optical fiber supported by the fold mirror.

In some embodiments, the beam reflected by the scanning reflector and directed along the line of sight through the lens, is reflected by a polarization beam splitter that folds the line of sight of the beam directed through the lens, and wherein the source comprises an optical fiber in a predetermined location relative to the polarization beam splitter that folds the line of sight of the beam directed through the lens.

In some embodiments, the source comprises an optical fiber supported by a monolithic member that has a portion that functions as the plane mirror and another portion that folds the line of sight of the beam reflected by the scanning reflector and directed along the line of sight through the lens.

In some embodiments, the source comprises an optical fiber supported by a transmissive member that also supports the plane mirror.

In another representative embodiment, a method for inspection or measurement of an object comprises illuminating the object with a measurement beam, using an optical assembly configured to direct a measurement beam through an outlet of the optical assembly, the optical assembly configured to fold the optical path of the measurement beam that is being directed through the outlet of the optical assembly.

In some embodiments, the optical assembly includes catadioptric optics.

In some embodiments, the optical assembly is configured to direct a measurement beam along a line of sight and through the outlet of the optical assembly, the optical assembly including a scanning reflector, the scanning reflector is moveable to adjust the focus of the measurement beam along the line of sight.

In another representative embodiment, a method for manufacturing a structure comprises producing the structure based on design information; obtaining shape information of structure by illuminating the object with a measurement beam, using an optical assembly configured to direct a measurement beam through an outlet of the optical assembly, the optical assembly configured to fold the optical path of the measurement beam that is being directed through the outlet of the optical assembly; and comparing the obtained shape information with the design information.

In some embodiments, the method for manufacturing the structure according further comprises reprocessing the structure based on the comparison result.

In some embodiments of the distance measurement apparatus, the reference beam is reflected by the lens.

In some embodiments, reprocessing the structure includes producing the structure over again.

Thus, the present invention provides new and useful concepts for an apparatus, optical assembly, method for inspection or measurement of an object and method for manufacturing a structure. With the foregoing description in mind, the manner in which those concepts (e.g. the optical assembly of the present embodiments) can be implemented in various types of laser radar systems, as well as other types of optical systems and methods, will be apparent to those in the art.

The invention claimed is:

1. A distance measurement apparatus, comprising:
an optical assembly for focusing a measurement beam from a light source along an optical axis of the optical assembly, where a lens, a scanning reflector and a fixed reflector are oriented relative to each other such that the measurement beam from the light source is reflected by the scanning reflector to the fixed reflector, and reflected light from the fixed reflector is reflected again by the scanning reflector and directed along the optical axis through the lens,
wherein the scanning reflector is capable of moving relative to the fixed reflector to adjust the focus of the measurement beam along the optical axis at a target surface, and wherein the optical assembly is configured to produce a reference beam from the light source that is related to the location of the scanning reflector relative to the fixed reflector;

wherein the reference beam does not travel to the target surface;

a detector configured to receive a portion of the measurement beam returned by the target surface and a portion of the reference beam from the optical assembly; and a controller configured to measure a distance of the target surface based at least in part on a signal from the detector, the signal from the detector being based at least in part on the reference beam interfering with the measurement beam.

2. The distance measurement apparatus of claim 1, wherein the optical assembly is situated so that the measurement beam and the reference beam have a common number of traverses of the scanning reflector of the optical assembly as received at the detector.

3. The distance measurement apparatus of claim 1, wherein the scanning reflector comprises a retroreflector.

4. The distance measurement apparatus of claim 3, wherein the scanning reflector is a corner cube.

5. The distance measurement apparatus of claim 1, wherein the optical assembly is situated so that an optical path length of the reference beam changes due to changes in the orientation of the scanning reflector.

6. The distance measurement apparatus of claim 1, wherein the reference beam is a collimated beam in the optical assembly.

7. The distance measurement apparatus of claim 1, wherein the reference beam is reflected by the lens.

8. The distance measurement apparatus of claim 1, wherein the light source includes an optical fiber configured to provide the measurement beam.

9. A distance measurement apparatus, comprising:

an optical assembly configured to focus a measurement beam from a light source onto a target along an optical axis of the optical assembly;

a detector configured to receive a portion of the measurement beam returned by the target surface and a portion of a reference beam from the optical assembly, wherein the reference beam does not travel to the target surface;

a controller configured to measure a distance of the target based at least in part on a signal from the detector, the signal from the detector being based at least in part on the reference beam interfering with the measurement beam;

wherein the optical assembly includes a lens, a fixed reflector, and a first scanning reflector oriented relative to each other such that the measurement beam from the light source is reflected by the first scanning reflector to the fixed reflector, and reflected light from the fixed reflector is reflected again by the first scanning reflector and directed along the optical axis through the lens, the first scanning reflector being capable of moving relative to the fixed reflector to focus the measurement beam along the optical axis at a target surface;

wherein the optical assembly includes a second scanning reflector situated so that an optical path length of the reference beam changes due to changes in the orientation of the first scanning reflector, and the second scanning reflector is synchronously movable with the first scanning reflector, and the reference beam is reflected by the second scanning reflector.

10. The distance measurement apparatus of claim 9, wherein the first scanning reflector and second scanning reflector comprise a single reflector.

11. The distance measurement apparatus of claim 9, wherein the first scanning reflector is capable of moving along the optical axis relative to the fixed reflector, to adjust the focus of the measurement beam along the optical axis at the target surface.

12. The distance measurement apparatus of claim 11, wherein the scanning reflector comprises a retroreflector.

13. The distance measurement apparatus of claim 12, wherein the scanning reflector is a corner cube.

14. The distance measurement apparatus of claim 9, wherein the optical assembly is situated so that the measurement beam and the reference beam have a common number of traverses of the scanning reflector of the optical assembly as received at the detector.

15. The distance measurement apparatus of claim 14, wherein
the first scanning reflector is movable along the optical axis relative to the light source, the lens, and the fixed reflector to adjust the focus of the measurement beam along the optical axis.

16. The distance measurement apparatus of claim 10, wherein the light source includes an optical fiber configured to provide the measurement beam.

17. A distance measuring method, comprising:

focusing a measurement beam on a target with an optical assembly, the target comprising a structure;

detecting at least a portion of the measurement beam returned by the target surface and a portion of a reference beam from the optical assembly, wherein the reference beam does not travel to the target surface;

measuring a distance of the target based at least in part on a signal generated by detection of the measurement beam returned by the target surface and the reference beam from the optical assembly, the signal being based at least in part on the reference beam interfering with the measurement beam; and obtaining shape information of the structure based at least in part on the distance measurement;

wherein the optical assembly includes a lens, a scanning reflector and a fixed reflector oriented relative to each other such that the measurement beam from the light source is reflected by the scanning reflector to the fixed reflector, and reflected light from the fixed reflector is reflected again by the scanning reflector and directed along an optical axis of the optical assembly through the lens, wherein the scanning reflector is capable of moving relative to the fixed reflector, to adjust the focus of the measurement beam along the optical axis at the target surface, and wherein the optical assembly is configured to produce the reference beam from the light source, and wherein the reference beam is related to the location of the scanning reflector relative to the fixed reflector.

18. A method for manufacturing a structure, comprising:
producing the structure based on design information;
obtaining shape information of the structure using the method of claim 17; and
comparing the obtained shape information with the design information.

19. A distance measuring method comprising:
focusing a measurement beam on a target with an optical assembly, the target comprising a structure;

with a detector, detecting at least a portion of the measurement beam returned by the target surface and at least a portion of a reference beam from the optical assembly, wherein the reference beam does not travel to the target;

measuring a distance of the target based at least in part on a signal from the detector, the signal from the detector being based at least in part on the reference beam interfering with the measurement beam; and obtaining shape information of the structure based at least in part on the distance measurement;

wherein the optical assembly includes a lens, a first scanning reflector and a fixed reflector oriented relative to each other such that the measurement beam from the light source is reflected by the scanning reflector to the fixed reflector, and reflected light from the fixed reflector is reflected again by the scanning reflector and directed along an optical axis of the optical assembly through the lens;

wherein the first scanning reflector is capable of moving relative to the fixed reflector to focus the measurement beam along the optical axis at the target surface; and wherein the optical assembly includes a second scanning reflector situated so that an optical path length of the reference beam changes due to changes in the orientation of the first scanning reflector, and the second scanning reflector is synchronously movable with the first scanning reflector, and the reference beam is reflected by the second scanning reflector.

20. A method for manufacturing a structure, comprising:
producing the structure based on design information;
obtaining shape information of the structure using the method of claim 19;
comparing the obtained shape information with the design information.

21. The method according to claim 18, further comprising reprocessing the structure based on a result of the comparing step.

22. The method according to claim 21, wherein reprocessing the structure includes producing the structure over again.

23. The distance measurement apparatus of claim 1, wherein the scanning reflector is movable along the optical axis relative to the fixed reflector to adjust the focus of the measurement beam along the optical axis at the target surface.

* * * * *